US006259492B1

(12) United States Patent
Imoto et al.

(10) Patent No.: US 6,259,492 B1

(45) Date of Patent: Jul. 10, 2001

(54) ELECTRO-OPTICAL APPARATUS HAVING ANTIFERRODIELECTRIC LIQUID CRYSTAL PANEL WITH NORMALIZATION TO PREVENT WHITE BRIGHTENING

(75) Inventors: Satoshi Imoto, Tanashi; Heihachiro Ebihara, Tokorozawa, both of (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/155,888

(22) PCT Filed: Oct. 27, 1997

(86) PCT No.: PCT/JP97/03893

§ 371 Date: Oct. 8, 1998

§ 102(e) Date: Oct. 8, 1998

(87) PCT Pub. No.: WO98/36312

PCT Pub. Date: Aug. 20, 1998

(30) Foreign Application Priority Data

Feb. 12, 1997 (JP) .................................................. 9-027375

(51) Int. Cl.[7] ............................ G02F 1/133; C09K 19/02

(52) U.S. Cl. .............................................. 349/33; 349/174

(58) Field of Search ............................... 349/33, 72, 174; 345/94, 101, 147

(56) References Cited

U.S. PATENT DOCUMENTS 4,743,097 * 5/1988 Johnson et al. ........................ 349/17
5,047,847 * 9/1991 Toda et al. ............................... 349/1
5,459,481 10/1995 Tanaka et al. ......................... 345/95
5,844,540 * 12/1998 Terasaki ................................ 349/61
5,886,755 * 3/1999 Imoto et al. ......................... 349/174

FOREIGN PATENT DOCUMENTS 2-165122 6/1990 (JP) .
5-119746 5/1993 (JP) .
6-202078 7/1994 (JP) .
8-254683 10/1996 (JP) .
8-334746 12/1996 (JP) .
9-15561 1/1997 (JP) .

* cited by examiner

*Primary Examiner*—Walter J. Malinowski
(74) *Attorney, Agent, or Firm*—Finnegan, Henderson, Farabow, Garrett & Dunner, L.L.P.

(57) ABSTRACT

An antiferroelectric liquid crystal display apparatus free from burn-in and achieving high display quality is provided by providing means for preventing pixel brightness from varying between pixels continuously held in an ON (bright) state and pixels continuously held in an OFF (dark) state. Aging processing is performed to saturate the brightness level of pixels into a stable state and thereby prevent the occurrence of a white brightening phenomenon. For this purpose, the brightness at a no voltage condition (base brightness) is set to a normalized level for all pixels in the liquid crystal panel that are required to exhibit uniform display performance. Further, temperature variations in the liquid crystal panel are eliminated to stabilize the brightness level and thereby prevent the occurrence of a white darkening phenomenon. Means is also provided for repeatedly performing normalization processes automatically or manually.

23 Claims, 17 Drawing Sheets

(a)

(b)

(a)

(b)

(c)

(a)

(b)

ELECTRO-OPTICAL APPARATUS HAVING ANTIFERRODIELECTRIC LIQUID CRYSTAL PANEL WITH NORMALIZATION TO PREVENT WHITE BRIGHTENING

TECHNICAL FIELD

The present invention relates to an electro-optical apparatus having an antiferroelectric liquid crystal panel, and is applicable to an apparatus that uses an antiferroelectric liquid crystal panel as a display device, or to any kind of apparatus that uses an antiferroelectric liquid crystal panel as an electro-optical shutter or for purposes other than as a display device. The description given herein is, however, directed to an apparatus in which the antiferroelectric liquid crystal panel is used as a display device (such apparatus is hereinafter referred to as the "antiferroelectric liquid crystal display apparatus"). Further, the description deals specifically with the case of matrix driving, but the present invention is not limited to matrix-addressed liquid crystal panels; rather, the invention is applicable not only to matrix addressed liquid crystal panels but also to segment-type liquid crystal panels.

BACKGROUND ART

An antiferroelectric liquid crystal panel stabilizes into an antiferroelectric state when the liquid crystal panel is left in a condition of no voltage application (zero volts). This stable condition is hereinafter referred to as the neutral state. The antiferroelectric liquid crystal panel can be constructed to produce a dark display in the neutral state or a bright display in the neutral state. The present invention is applicable to both modes of operation. The description given herein deals with a panel that produces a dark display in the neutral state. It should also be noted that the antiferroelectric liquid crystal panels used in our investigations and embodiments have been treated by isotropic processing in which the panel is heated in a furnace or the like and then cooled to its normal operating temperature. This treatment is applied not only to antiferroelectric liquid crystal panels but to other conventional liquid crystal panels, as necessary, in order to stabilize the condition of liquid crystal layers; if the liquid crystal condition is stable from the beginning, this treatment is not particularly needed. Further, even when this treatment is needed, the treatment need only be performed once in the final step of the panel manufacturing process. Therefore, whether to perform or not perform this treatment can be determined freely.

FIG. 1 is a diagram showing, as an example, the optical transmittance of an antiferroelectric liquid crystal as a function of applied voltage with the applied voltage plotted along the abscissa and the optical transmittance plotted along the ordinate.

When an increasing positive voltage is applied to the liquid crystal which is in the neutral state at point 0, the optical transmittance begins to increase abruptly at voltage Ft and reaches approximately the maximum transmittance at voltage Fs to enter a saturated ferroelectric state. After that, if the applied voltage is further increased, the optical transmittance remains substantially unchanged. Next, when the applied voltage is gradually decreased, the optical transmittance begins to drop abruptly at voltage At and reaches almost zero at voltage As to return to the antiferroelectric state. Likewise, when the applied voltage is increased from 0 V in the negative direction, the optical transmittance begins to increase abruptly at voltage −Ft and reaches approximately the maximum transmittance at voltage −Fs to enter a saturated ferroelectric state. After that, when the applied voltage is gradually brought toward 0 V, the optical transmittance begins to drop abruptly at voltage −At and reaches almost zero at voltage −As to return to the antiferroelectric state. In this way, the ferroelectric state of the liquid crystal can be achieved by applying either a positive voltage or a negative voltage. The former case will be referred to as the (+) ferroelectric state and the latter case as the (−) ferroelectric state. Further, |Ft| will be referred to as the ferroelectric threshold voltage, |Fs| as the ferroelectric saturation voltage, |At| as the antiferroelectric threshold voltage, and |As| as the antiferroelectric saturation voltage.

Generally, a matrix-addressed liquid crystal panel comprises N row electrodes and M column electrodes arranged in a matrix form. To drive the panel, a scan signal is applied to each row electrode via a row electrode driving circuit, and a display signal, which is dependent on the display data of each pixel (though the signal may contain a portion that does not depend on the display data), is applied to each column electrode via a column electrode driving circuit, thereby applying to the liquid crystal layer a voltage representing the difference between the scan signal and the display signal (the difference voltage will be hereinafter simply referred to as the "synthetic voltage"). The period required to scan all the row electrodes (one vertical scan period) is usually known as one frame (or one field). In liquid crystal driving, the polarity of the drive voltage is reversed for each frame (or for every multiple frames) to prevent an ill effect on the liquid crystal (for example, deterioration due to clustering of ions in a particular direction).

When the scan signal applied to one row electrode is examined, its vertical scan period consists of N horizontal scan periods (in some cases, an additional period may be included). The horizontal scan period during which a scan voltage for determining the display state of the pixels in the active row (hereinafter referred to as the "selection voltage") is applied is called the selection period tw for that row, and the other horizontal scan periods are collectively called the non-selection periods.

Usually, in an antiferroelectric liquid crystal panel, when applying the selection voltage, it is determined whether the liquid crystal in the antiferroelectric state should be maintained in that state or be caused to make a transition to the ferroelectric state. For this purpose, a period during which the liquid crystal state is set in the antiferroelectric state is required prior to the application of the selection voltage; hereinafter, this period is called the relaxation period ts. During other periods than the selection period tw and relaxation period ts, the liquid crystal must be held in the determined state; this period is called the holding period tk.

FIG. 2 is a diagram showing the scan signal waveform (Pa), display signal waveform (Pb, Pb'), and composed voltage waveform (Pc, Pc') applied to an arbitrary attention pixel in an antiferroelectric liquid crystal panel in accordance with the drive method illustrated in FIGS. 1 and 2 in Japanese Patent Unexamined Publication NO. 4-362990, along with light transmittance L100, L0.

In FIG. 2, F1 and F2 denote a first frame and a second frame, respectively. The figure shows the case where the polarity of the drive voltage is reversed for each frame. As can be seen from the figure, the polarity of the drive voltage is simply reversed between the first frame F1 and the second frame F2, and as is apparent from FIG. 1, the liquid crystal operation is symmetrical relative to the polarity of the drive voltage. The following description, therefore, deals only with the first frame, unless otherwise noted.

In FIG. 2, one frame is divided into three periods: the selection period tw, the holding period tk, and the relaxation period ts. The selection period tw is further divided into periods tw1 and tw2 of equal length. The voltage of the scan signal Pa in the first frame F1 is set as shown below. Of course, the polarity of the voltage is reversed in the second frame F2. Here, ±V1 is the selection voltage.

Period tw1 tw2 tk ts

Scan signal voltage 0+V1+V3 0

The display signal is set as shown below according to the display state of the attention pixel. Note that the voltages indicated by the symbol * depend on the display data of other pixels in the same column.

Period tw1 tw2 tk ts

ON display signal voltage +V2 −V2 * *

OFF display signal voltage +V2 −V2 * *

In the hysteresis curves shown in FIG. 1, the curve, for example, from As to Ft or from At to Fs, is generally not flat; therefore, if the voltage applied to the liquid crystal during the holding period tk is held in one particular direction depending on the display signal, variation is caused in the brightness during that period. To avoid this, the polarity of the display signal is usually reversed so that its average value becomes zero over one horizontal scan period. More specifically, the polarity of the display signal is reversed between the period twl and the period tw2.

In FIG. 2, Pb, Pc, and L100 indicate the display signal waveform, the synthetic voltage waveform, and the optical transmittance, respectively, when all the pixels in the column containing the attention pixel are in the ON (bright) state. In this case, if the voltage (synthetic voltage) applied to the liquid crystal during the period tw2 is $|V1+V2|>|Ft|$ (see FIG. 1), the liquid crystal begins to make a transition to the ferroelectric state, and the optical transmittance increases. In the holding period tk, if $|V3-V2|>|At|$, the bright state can be maintained. In the relaxation period ts, if $|V2|<|As|$, the optical transmittance decreases with time, and the liquid crystal relaxes from the ferroelectric state back to the stable antiferroelectric state.

In FIG. 2, Pb', Pc', and L0 indicate the display signal waveform, the synthetic voltage waveform, and the optical transmittance, respectively, when all the pixels in the column containing the attention pixel are in the OFF (dark) state. In this case, the dark state can be produced if the composed voltage in the period tw2 is $|V1-V2|<|Ft|$, the voltage applied during the holding period tk is $|V3+V2|<|Ft|$, and the voltage applied during the relaxation period ts is $|V2|<|Ft|$.

SUMMARY OF THE INVENTION

According to the drive method in FIG. 2 shown above, when pixels continuously held in the ON (bright) state for a long period and pixels continuously held in the OFF (dark) state for a long period were subsequently driven both in the same display state, there were cases where a difference occurred in the brightness (referring to the brightness of transmitted light or reflected light). This lead to a phenomenon in which the previous display pattern looked as if it were burned in (hereinafter referred to as the "burn-in" phenomenon), causing a serious problem resulting in the degradation of the display quality.

An investigation revealed that there are two cases, that is, the brightness becomes higher for the pixels continuously held in the ON (bright) state than for the pixels continuously held in the OFF (dark) state (hereinafter referred to as the "white brightening phenomenon"), or becomes lower (hereinafter referred to as the "white darkening phenomenon"), and that, depending on the antiferroelectric liquid crystal panel used, both phenomena are observed or only the white darkening phenomenon is primarily observed.

Accordingly, to solve the above problem, the present invention provides an electro-optical apparatus having an antiferroelectric liquid crystal panel with high display quality free from the burn-in phenomenon by devising means for preventing pixel brightness from varying between pixels continuously held in the ON (bright) state and pixels continuously held in the OFF (dark) state in the antiferroelectric liquid crystal panel (hereinafter simply referred to as the "liquid crystal panel", except where explicitly stated).

The present inventor applied voltages of various waveforms to a liquid crystal panel in which both the white brightening phenomenon and white darkening phenomenon are observed, and removed the voltages to place the liquid crystal panel in a no-voltage applied condition. The inventor then examined the brightness of the liquid crystal panel at no voltage application condition (hereinafter called the "base brightness". The result showed that there occurred a difference in the variation of the base brightness, depending on the presence or absence of a relaxation period in the applied voltage waveform. It was found that when a waveform without a relaxation period was applied, the base brightness decreased to a minimum level, and when a waveform with a relaxation period was applied thereafter, the base brightness increased, but the base brightness decreased again to the minimum level when the waveform without a relaxation period was applied one again.

The above fact means that application of a voltage to the antiferroelectric liquid crystal causes a change in the liquid crystal state, and that the change differs depending on the waveform of the applied voltage.

Regarding the change of the liquid crystal state due to an applied voltage, Japanese Patent Unexamined Publication No. 2-222930, for example, describes that there are two layer structures in an antiferroelectric liquid crystal, a bookshelf structure and a chevron structure, and that when a large voltage is applied to a liquid crystal layer in the chevron structure, the liquid crystal layer changes to the bookshelf structure. However, no description is given therein as to whether liquid crystal in the bookshelf structure changes to the chevron structure by the application of a voltage.

The invention described in Japanese Patent Unexamined Publication No. 2-222930 is characterized by applying an electric field to a liquid crystal layer, which is in the chevron structure and whose liquid crystal elements have not been subjected to an electric field before, and thereby changing the structure of the liquid crystal to the bookshelf structure.

It was also found that the brightness level is related to the temperature of the liquid crystal panel; that is, when a temperature change which reduces interlayer spacing occurs in the panel held in the state of the minimum brightness level, the base brightness changes in the increasing direction, and when a temperature change which increases the interlayer spacing occurs, the base brightness remains substantially unchanged. Further, a change in temperature also causes a change in the liquid crystal structure. It was found, when a temperature change which increases the interlayer spacing occurs in the liquid crystal in the bookshelf structure, the structure of the liquid crystal layer changes to a more vertically straightened bookshelf structure, and when such a temperature change as to reduce the interlayer spacing occurs again, the liquid crystal changes to the chevron structure. It is believed that the structural change of the liquid crystal layer is also related to the change of the base brightness.

Utilizing these properties, the present invention provides the following means in an antiferroelectric liquid crystal display apparatus to solve the earlier described problem.

A first means that the present invention uses to solve the above problem is to provide, in an electro-optical apparatus having an antiferroelectric liquid crystal panel, a means for performing processing (hereinafter called the "normalization processing") in which the brightness at a no voltage application condition (the base brightness) is normalized approximately to the normalized level hereinafter described for all pixels, in the liquid crystal panel, that are required to exhibit uniform display performance, the processing being performed manually or automatically with the liquid crystal panel assembled into the apparatus.

A second means that the present invention uses to solve the above problem is to set the base brightness of all the pixels that are required to exhibit uniform display performance, approximately equal to the aging brightness level hereinafter described by the normalization processing.

A third means that the present invention uses to solve the above problem is to perform, at least as part of the normalization processing, processing in which a waveform having both a period that causes liquid crystal in an antiferroelectric state to make a transition to a ferroelectric state and a period that causes at least part of the liquid crystal in the ferroelectric state to make a transition back to the antiferroelectric state, is forcefully applied to the liquid crystal panel.

A fourth means that the present invention uses to solve the above problem is to apply, at least as part of the normalization processing, a temperature change which reduces liquid crystal interlayer spacing in the liquid crystal panel.

A fifth means that the present invention uses to solve the above problem is to provide, in the electro-optical apparatus having an antiferroelectric liquid crystal panel, a means for controlling the temperature of the liquid crystal panel to within a temperature range where a difference in the variation of the base brightness level is indiscernible.

A sixth means that the present invention uses to solve the above problem is to include in the control temperature range, in the implementation of the fifth means, a temperature at which the slope of the change of the interlayer spacing in the liquid crystal layer relative to the change of the temperature is at a minimum.

A seventh means that the present invention uses to solve the above problem is to provide means for detecting or judging the occurrence, or the possibility of occurrence, of burn-in in the liquid crystal panel.

An eighth means that the present invention uses to solve the above problem is to use, in the seventh means, the change of the temperature in the liquid crystal panel as a means for judging the possibility of burn-in.

A ninth means that the present invention uses to solve the above problem is to provide means for having the normalization processing performed by applying the supply voltage of the electro-optical apparatus having the antiferroelectric liquid crystal panel.

A tenth means that the present invention uses to solve the above problem is to have the normalization processing performed based on means other than the application of the supply voltage.

As described above, according to the present invention, an electro-optical apparatus having an antiferroelectric liquid crystal panel achieving a good display appearance free from burn-in can be provided by eliminating the white brightening phenomenon in which the brightness of pixels continuously held in the bright state becomes higher than the brightness of pixels continuously held in the dark state and also the white darkening phenomenon in which the brightness of pixels continuously held in the bright state becomes lower than the brightness of pixels continuously held in the dark state.

As earlier noted, the description given herein deals with an apparatus that uses an antiferroelectric liquid crystal panel as a display device.

DETAILED DESCRIPTION OF THE INVENTION

The present inventor investigated how the state of a liquid crystal panel set in a specific initial state changes in response to the waveform of the voltage applied thereafter. Processing in which a voltage greater than the ferroelectric saturation voltage is applied continuously to the antiferroelectric liquid crystal (such processing is hereinafter called the "voltage processing") was used as a method to obtain the specific initial state.

Figure 3:
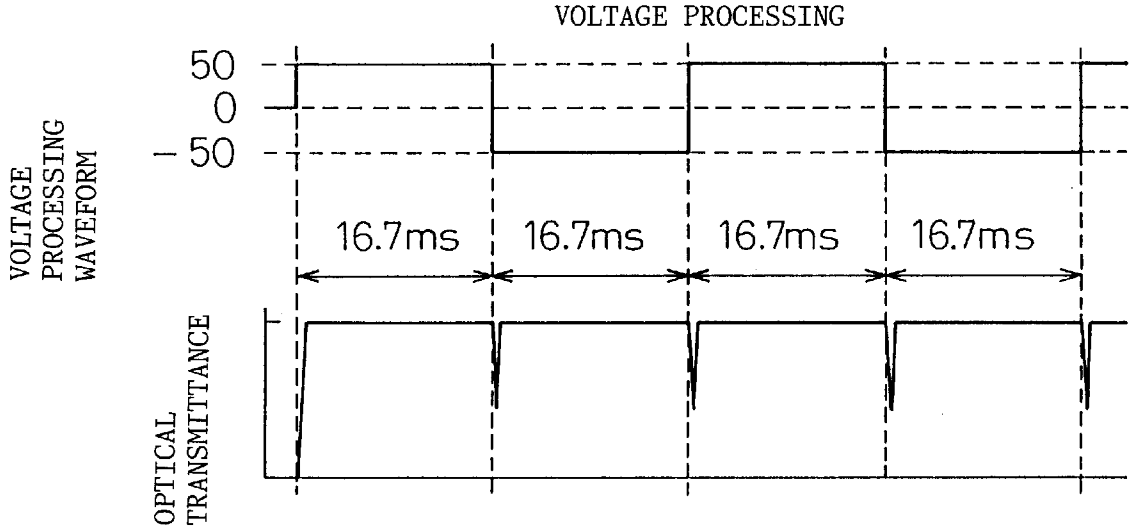
FIG. 3 is a diagram showing an example of a voltage processing waveform in the present invention and the corresponding optical transmittance of the liquid crystal panel.

FIG. 3 is a diagram showing an example of the voltage processing waveform used in the voltage processing in the present invention, along with the optical transmittance of the liquid crystal panel corresponding to the applied waveform. When this voltage waveform is applied, the optical transmittance rapidly increases in the period during which a voltage greater than the positive ferroelectric saturation voltage is applied, and the liquid crystal enters the (+) ferroelectric state. When the polarity is reversed, the liquid crystal makes a transition from the (+) ferroelectric state to the (−) ferroelectric state without transitioning to the antiferroelectric state, so that the optical transmittance again increases rapidly though the transmittance momentarily drops. During the application of this voltage processing waveform, the liquid crystal molecules do not enter the antiferroelectric state.

Figure 4:
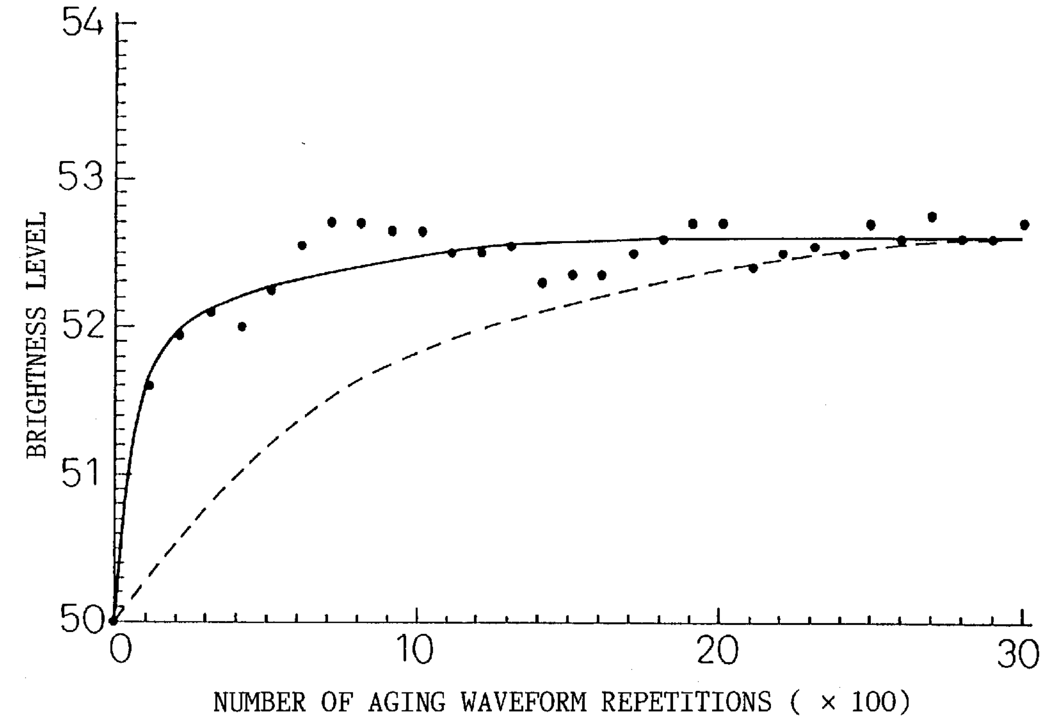
FIG. 4 is a diagram showing how the base brightness changes when a waveform with a relaxation period is repeatedly applied.

FIG. 4 is a diagram showing how the base brightness changes with each application of a voltage waveform having a relaxation period when the waveform is repeatedly applied after the voltage processing. First, the voltage processing waveform (with no relaxation period) shown in FIG. 3 was applied to the liquid crystal panel for about 10 seconds to set the panel in the initial state, and the base brightness was measured; the measured level was 50. After that, an AC waveform, one cycle of which consisted of a 50 V application period of 16.7 ms, a 0 V relaxation period of 16.7 ms, a −50 V application period of 16.7 ms, and a 0 V relaxation period of 16.7 ms, was applied repeatedly, and the base brightness during the repetitions was measured to examine how it varied. The base brightness, which was at the minimum level of 50 in the initial state, increased with increasing number of applications and eventually reached saturation at a level of 52.5.

When the proportion of the relaxation period in one cycle was reduced while holding the maximum amplitude of the applied voltage waveform and the length of one cycle constant, the number of repetitions required for the base brightness to reach saturation increased, as shown by the dashed line in FIG. 4, and when the proportion of the relaxation period was reduced to zero, the base brightness remained unchanged at the level 50.

In the following description, the "minimum brightness level (La)" refers to the minimum base brightness level obtained by the conventional art voltage processing in which a waveform that has only one period during which the liquid crystal in the antiferroelectric state is caused to make a transition to the ferroelectric state is repeatedly applied. Further, the "aging brightness level (Lb)" refers to the saturated base brightness level achieved by processing (hereinafter called the voltage aging processing) in which a voltage waveform is repeatedly applied that has both a period during which the liquid crystal in the antiferroelectric state is caused to make a transition to the ferroelectric state and a period during which the liquid crystal in the ferroelectric state is caused to make a transition to the antiferroelectric state. In the above-described case, La=50 and Lb=52.5.

Further, in the following description, the "normalized level" refers to an arbitrary suitable level not lower than the minimum brightness level (La) and not higher than the aging brightness level (Lb), and the "normalization processing" refers to the processing for setting the base brightness approximately to the same normalized level for all the pixels in the liquid crystal panel that are required to be displayed uniformly.

Figure 1:
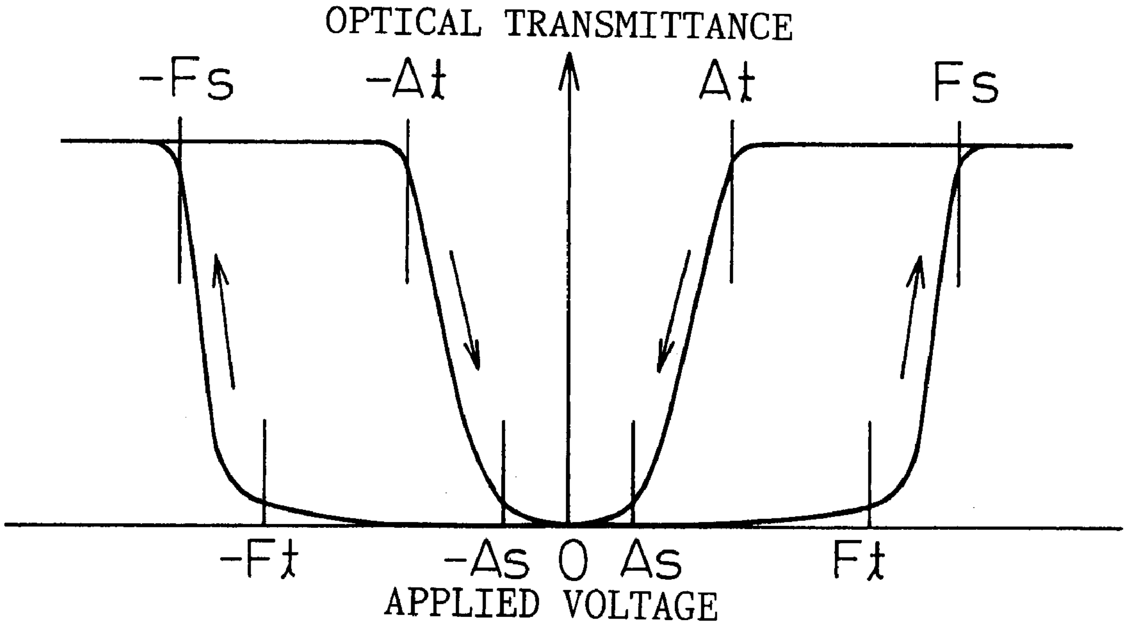
FIG. 1 is a diagram showing the optical transmittance of an antiferroelectric liquid crystal panel versus the voltage applied thereto.
Figure 2:
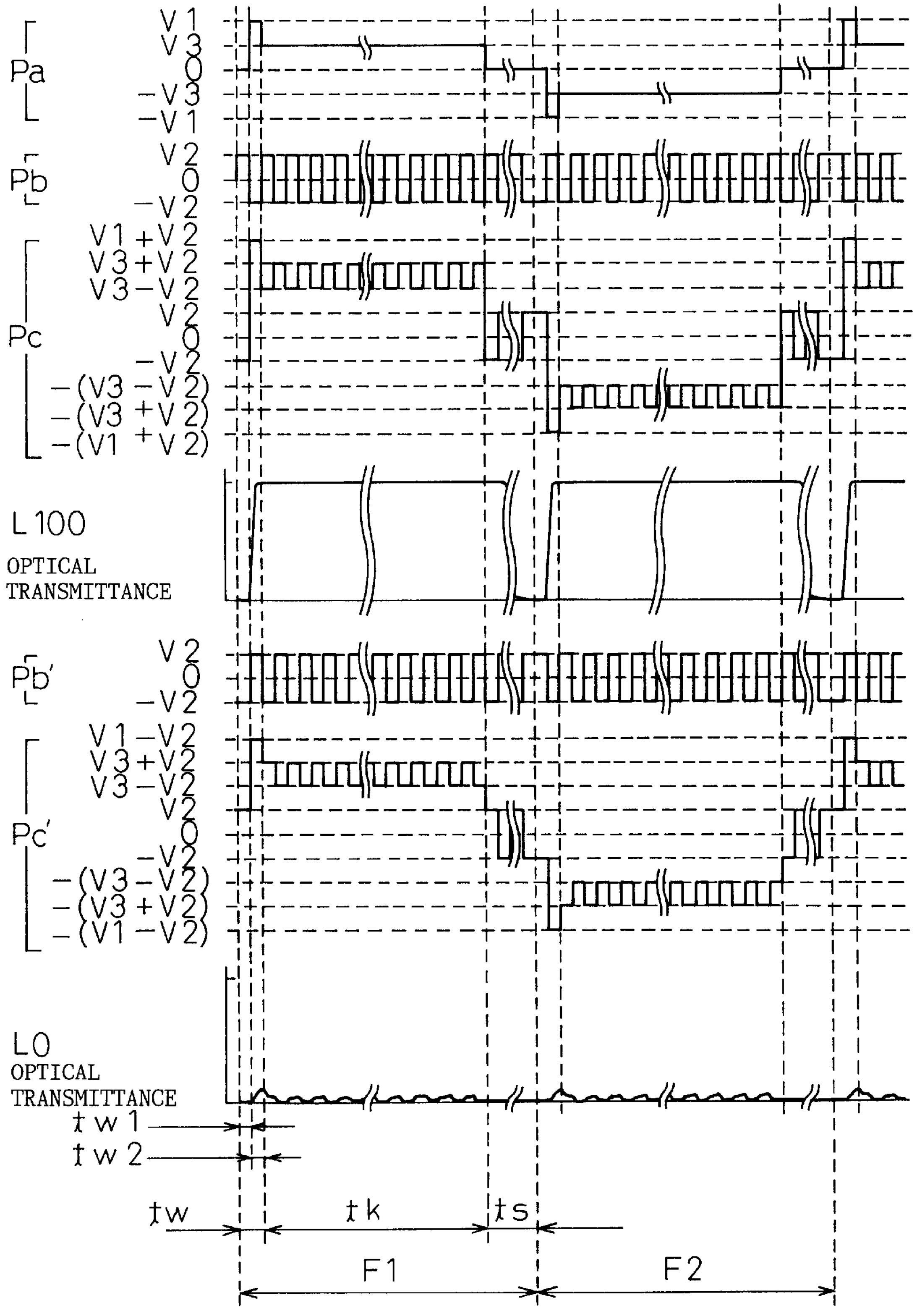
FIG. 2 is a diagram showing drive waveforms and optical transmittance, illustrating an example of a driving method for the antiferroelectric liquid crystal panel.

To examine the effects of the above-described phenomenon on an actual selection display (a mode of display in which each pixel is selectively driven to produce a white display or black display in accordance with display data), the present inventor conducted a detailed investigation by applying the actual drive waveforms (drive waveforms to achieve the selection display) shown in FIG. 2 to the voltage-processed liquid crystal panel while varying the voltages and the lengths of the selection period tw, holding period tk, and relaxation period ts. The result showed that when the absolute value of the voltage in the relaxation period ts was set smaller than At in FIG. 1, a change occurred in the base brightness in a pixel continuously driven to produce a white display. On the other hand, no change was observed in the base brightness of a pixel continuously driven to produce a black display. The difference between the white display and black display means the presence or absence of a period during which the liquid crystal molecules are in the ferroelectric state. Further, reducing the absolute value of the voltage in the relaxation period ts below At means that during this period at least some of the liquid crystal molecules in the ferroelectric state (such molecules are considered to be relatively unstable) return from the ferroelectric state to the antiferroelectric state.

When these things are taken together, it can be seen that a change occurs in the base brightness when a behavior occurs in which the liquid crystal molecules in the ferroelectric state, even some of the molecules, make a transition to the antiferroelectric state.

Burn-in of the white brightening phenomenon can be explained by the above assumption. To describe this phenomenon in more detail, a liquid crystal panel whose base brightness in the initial state is lower than the aging brightness level, for example, a liquid crystal panel such as the one voltage-processed for initialization using only a waveform with no relaxation period according to the prior art, is driven in the usual manner. In this case, pixels continuously driven in the OFF (dark) state remain in the antiferroelectric state; therefore, for such pixels, there cannot occur a behavior in which the liquid crystal in the ferroelectric state returns to the antiferroelectric state during the relaxation period, and hence, no change occurs in the base brightness. However, for pixels continuously driven in the ON (bright) state, since the behavior of returning from the ferroelectric state to the antiferroelectric state in the relaxation period is repeated, the base brightness gradually increases toward the aging brightness level (Lb), eventually resulting in the burn-in due to the white brightening phenomenon in which the base brightness becomes higher for the ON (bright) pixels than for the OFF (dark) pixels.

There are, however, liquid crystal panels in which the aging brightness level (Lb) is almost the same as the minimum brightness level (La); in such liquid crystal panels, the white brightening phenomenon does not occur.

The inventor conducted a similar experiment on a liquid crystal panel not subjected to the voltage processing in FIG. 4 (a panel in which the base brightness level is higher than the aging brightness level (Lb)), and confirmed that the base brightness gradually decreased and saturated at the aging brightness level (Lb). Burn-in of the white darkening phenomenon can be explained based on this result. To describe this phenomenon in more detail, an antiferroelectric liquid crystal whose base brightness level in the initial state is higher than the aging brightness level (Lb) is driven in the usual manner. In this case, pixels continuously driven in the OFF (dark) state remain in the antiferroelectric state; therefore, for such pixels, a behavior in which the liquid crystal in the ferroelectric state returns to the antiferroelectric state in the relaxation period cannot occur and, hence, no change occurs in the base brightness. On the other hand, for pixels continuously driven in the ON (bright) state, since the behavior of returning from the ferroelectric state to the antiferroelectric state in the relaxation period is repeated, the base brightness gradually decreases toward the aging brightness level (Lb), eventually resulting in the burn-in due to the white darkening phenomenon in which the brightness of the ON (bright) pixels becomes lower than the brightness of the OFF (dark) pixels. This is also true of liquid crystal panels in which the aging brightness level (Lb) is almost the same as the minimum brightness level (La).

According to the above study, burn-in due to the white darkening phenomenon cannot occur in liquid crystal panels whose base brightness has been lowered to the minimum brightness level (La) by applying the voltage processing, but in reality, burn-in due to the white darkening phenomenon can occur even in such liquid crystal panels. This means that there can occur cases where the base brightness of a liquid crystal panel subjected to the voltage processing varies and rises above the aging brightness level (Lb) for some reason. In the variation of antiferroelectric liquid crystals with temperature, it is known that the interlayer spacing of smectic layers change with temperature, and that the structure of the liquid crystal molecules changes from the bookshelf structure to the chevron structure due to changes in temperature.

Figure 5:
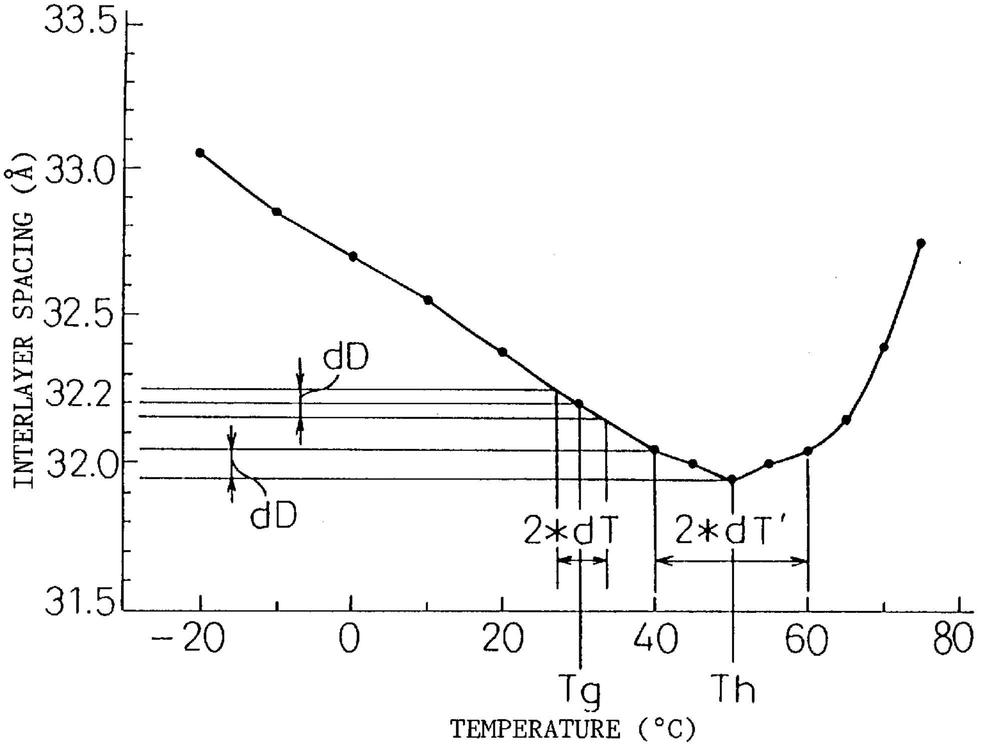
FIG. 5 is a diagram showing the temperature versus interlayer spacing characteristic of the antiferroelectric liquid crystal panel.

FIG. 5 shows one example of a graph showing the relationship between the temperature and the interlayer spacing for antiferroelectric liquid crystal. In the illustrated example, the interlayer spacing is smallest at 50° C. and the spacing increases as the temperature increases above or decreases below 50° C. The present inventor examined the influences of the temperature on the base brightness in a liquid crystal panel having the characteristic shown in FIG. 5.

Figure 6:
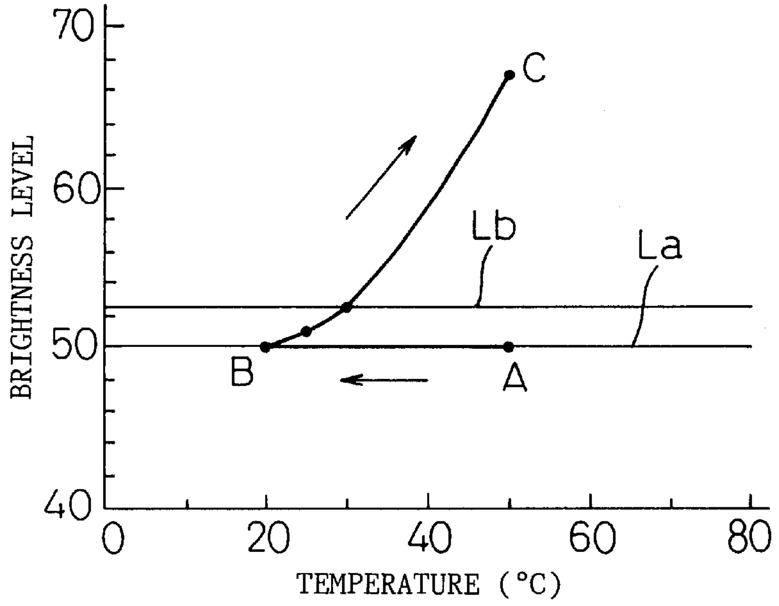
FIG. 6 is a diagram showing how the base brightness changes depending on the temperature history of the antiferroelectric liquid crystal panel.

FIG. 6 shows an example of how the base brightness changes depending on temperature history. The liquid crystal panel is subjected to voltage processing at 50° C., then the temperature is lowered to 20° C. and raised again to 50° C. FIG. 6 shows the relationship between the base brightness and the temperature during the process of this temperature history; as shown, the base brightness changed from point A to point B, then to point C. That is, in the illustrated example, when the temperature was lowered from 50° C. to 20° C., the base brightness remained substantially unchanged at level 50, but as the temperature was raised from 20° C. to 50° C., the base brightness increased and reached level 67 at point C. The present inventor conducted a similar experiment by varying the temperature at point B while holding the voltage processing temperature constant at 50° C. After performing voltage processing at 50° C., the temperature was raised above 50° C. and then lowered to 50° C.; the base brightness remained substantially unchanged during the temperature rise, but increased when the temperature was lowered back to 50° C.

Figure 7:
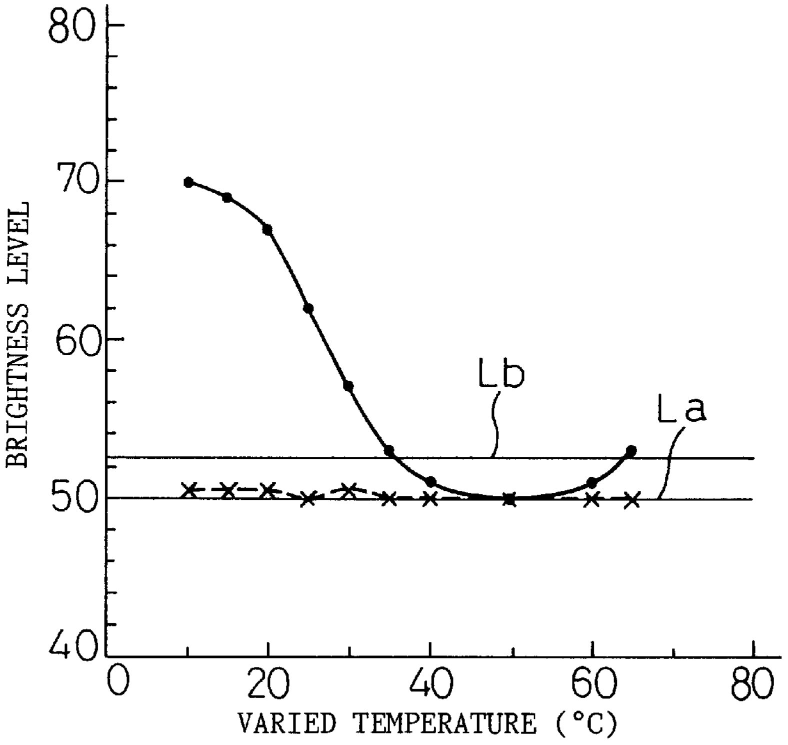
FIG. 7 is a diagram showing the relationship between the amount of change of the base brightness and the magnitude of the temperature history of the antiferroelectric liquid crystal panel.

FIG. 7 shows the level of the base brightness at point C when the temperature at point B in FIG. 6 (hereinafter referred to as the varied temperature) is varied. Here, brightness 67 at point C corresponding to 50° C. on the horizontal axis in FIG. 6, not brightness 50 at point B corresponding to 20° C. on the horizontal axis in FIG. 6, is plotted as corresponding to the varied temperature 20° C. on the horizontal axis in FIG. 7. From the comparison between FIGS. 7 and 5, it is considered that there is correlation between the variation of the brightness level and the interlayer spacing of the liquid crystal. According to FIG. 7, even when the base brightness is set to the level of 50 by performing the voltage processing at 50° C., once the temperature of the liquid crystal panel has thereafter been lowered to 10° C., the base brightness does not return to the level of 50 but increases up to the level of 70 even if the temperature is raised again to 50° C.

When the liquid crystal panel whose base brightness has increased as just described is driven in the ordinary selection display mode, the base brightness does not change in the case of pixels continuously driven in the dark state. On the other hand, in the case of pixels continuously driven in the bright state, since the base brightness gradually decreases toward the aging brightness level (Lb), this naturally results in the burn-in of the white darkening phenomenon.

The inventor conducted a similar experiment for further detailed investigation by subjecting the same liquid crystal panel to voltage processing at different temperatures. As the result of the experiment, it has been found that the change of the base brightness is closely related to the interlayer spacing which varies with temperature; that is, when a temperature change which reduces the interlayer spacing occurs in the liquid crystal panel held in the state of the minimum brightness level (La), the base brightness changes in the increasing direction, and when the interlayer spacing is increased, the base brightness remains almost unchanged.

The present inventor also conducted an investigation on a liquid crystal panel whose base brightness had increased above the minimum brightness level due to a temperature change. It has been found that when voltage processing is applied to the liquid crystal panel whose base brightness had increased due to the temperature history in FIG. 7, the base brightness decreases back approximately to the original minimum brightness level (La) as shown by the dashed line in FIG. 7 and, when an actual drive waveform is applied, the brightness level gradually approaches the aging brightness level (Lb). Further, it has been confirmed that when the temperature of the liquid crystal panel which has undergone a change from point A (50° C.) to point C (50° C.) via point B (20° C.) is lowered again to 20° C. and then raised back to 50° C., the liquid crystal panel now changes from point C to point B and returns to point C in FIG. 6. It has also been confirmed that when the temperature of the liquid crystal panel at point C is lowered to 10° C. and then raised back to 50° C., the base brightness at 50° C. rises up to the level of 70.

As previously described, it is known that, in antiferroelectric liquid crystal, not only the interlayer spacing but the structure also changes due to a change in temperature. Many researches using X-ray diffraction patterns for structural analysis have been published at academic meetings, etc., and it has been confirmed through X-ray studies that when a temperature change which increases the interlayer spacing is caused in the liquid crystal held in the bookshelf structure, the liquid crystal changes to a more vertically straightened bookshelf structure, and when a temperature change which reduces the interlayer spacing again is caused, the liquid crystal layer changes to the chevron structure that flexes in a < shape between a pair of substrates. From this data, it is thought that the change of the base brightness is also related to the structural change of the liquid crystal layer.

Though there are a number of things still unknown at present, the following prediction can be made. That is, in the bookshelf structure, the base brightness is low because the average molecular axis of the liquid crystal is aligned in one direction; on the other hand, in the chevron structure, since the average molecular axis of the liquid crystal can take two different directions, the average molecular axis is not aligned, and the base brightness is therefore high. Of the two structures, the chevron structure is stable in terms of energy, and in the initial state, most molecules are in the chevron structure.

When a voltage greater than the ferroelectric saturation voltage is continuously applied to the liquid crystal molecules in the chevron structure, almost all liquid crystal molecules change to a substantially vertical bookshelf structure, and the base brightness decreases to the minimum brightness level (La).

Of the liquid crystal molecule groups in the bookshelf structure, a limited number of unstable liquid crystal molecule groups change to the chevron structure inherent in the antiferroelectric liquid crystal during the process of changing from the ferroelectric state to the antiferroelectric state, and the base brightness slightly rises. However, the number of molecules that can change from the bookshelf structure to the chevron structure due to the behavior of the ferroelectric state changing to the antiferroelectric state is limited.

When the liquid crystal molecules in the chevron structure are subjected to a temperature change, the angle of the < shape of the chevron structure changes to accommodate the change in the interlayer spacing; in this case, the base brightness may change with temperature, but this change of the base brightness is reversible since it is not due to a structural change.

On the other hand, when the liquid crystal molecules in the bookshelf structure are subjected to a temperature change, if the temperature change is in the direction that increases the molecular layer spacing, the liquid crystal molecules change to a more vertically straightened bookshelf structure to accommodate the change in the interlayer spacing; therefore, the base brightness does not change. However, if the temperature change is in the direction that reduces the interlayer spacing, some of the liquid crystal molecules are subjected to energy greater than the threshold and change from the bookshelf structure to the chevron structure, and the base brightness increases irreversibly. Since the energy necessary to cause the change from the bookshelf structure to the chevron structure varies with the size of the series of molecule groups, only a limited number of molecule arrays can change to the chevron structure, depending on the degree of the temperature change.

Embodiments

Embodiments of the present invention based on the results of the above investigations will be described below.

Figure 8:
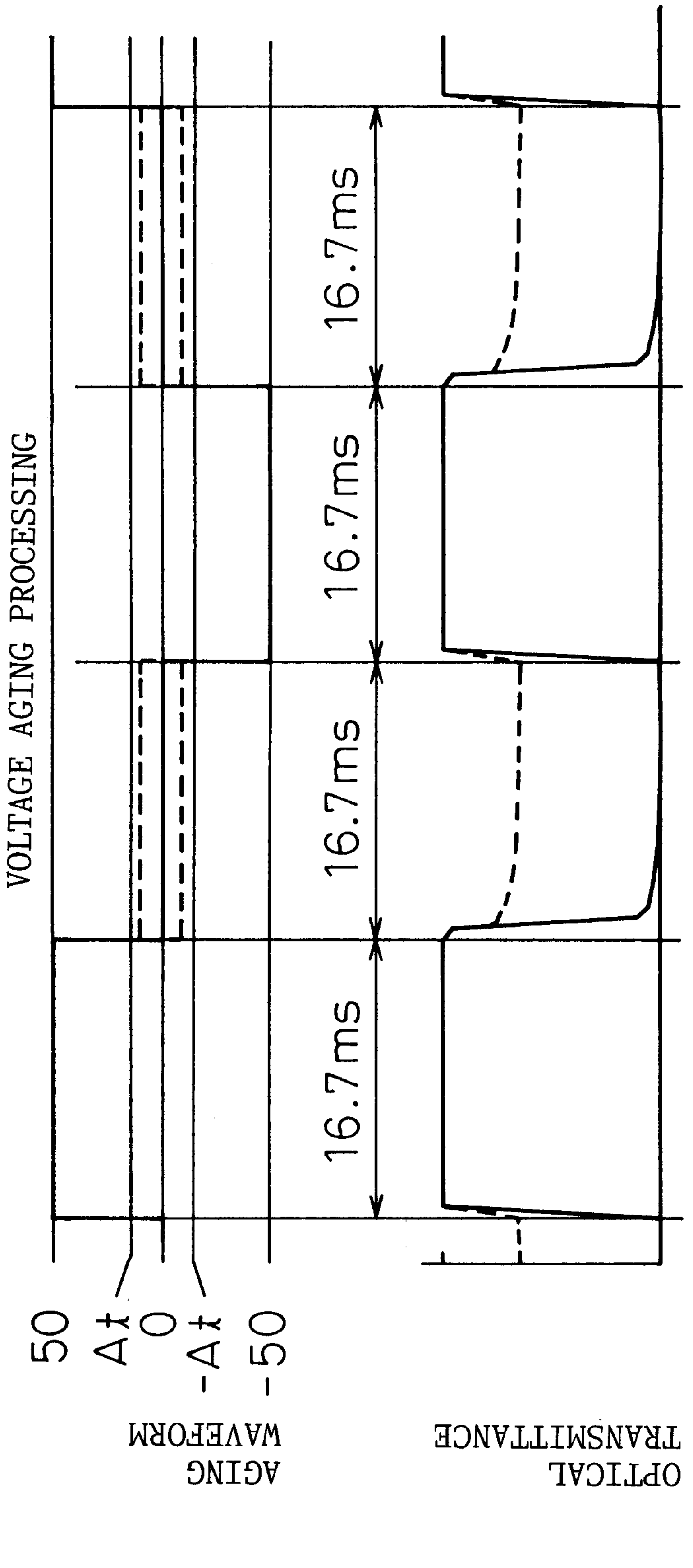
FIG. 8 is a diagram showing a first embodiment of the present invention, illustrating an example of a voltage waveform used for voltage aging in the present invention and the optical transmittance of the liquid crystal panel.

FIG. 8 is a diagram showing a first embodiment of the present invention, illustrating an example of the voltage waveform used for voltage aging in the present invention (hereinafter called the "aging waveform) and the optical transmittance of the liquid crystal panel when the voltage waveform is applied. The waveform shown by a thick solid line in FIG. 8 is an AC waveform having a sufficient voltage and period to cause a transition from the antiferroelectric state to the ferroelectric state and a sufficient voltage and period to cause a transition from the ferroelectric state back to the antiferroelectric state. When this voltage waveform is applied, during the period of application of a voltage greater than the ferroelectric saturation voltage the liquid crystal is set in the ferroelectric state and the optical transmittance increases, and during the period of application of a voltage smaller than the antiferroelectric saturation voltage all the liquid crystals are set in the antiferroelectric state and the optical transmittance decreases to the minimum level, as shown by the thick solid line.

As noted above, it is sufficient that the voltage waveform used for the voltage aging has a sufficient voltage and period to cause the liquid crystal molecules in the antiferroelectric state to make a transition to the ferroelectric state and a sufficient voltage and period to cause unstable molecules of the liquid crystal molecules in the ferroelectric state to change back to the antiferroelectric state. Accordingly, the voltage value in each period and the length of each period can be set at optimum values based on the characteristics of the liquid crystal panel used, and these values are not specifically limited. For example, the voltage in the latter period may be set at a value other than 0 V and less than $|At|$, as shown by a thick line in FIG. 8. The optical transmittance of the liquid crystal in this case does not drop to the minimum level, as shown by the dashed line, but if the voltage is sufficient to cause the unstable liquid crystal molecules to change back to the antiferroelectric state, such a waveform can be used as the voltage aging waveform.

Further, not only a square wave, but a triangular wave, a sine wave, or an actual drive waveform used to actually produce a display, or a similar waveform, can also be used as the voltage waveform for voltage aging.

Figure 9:
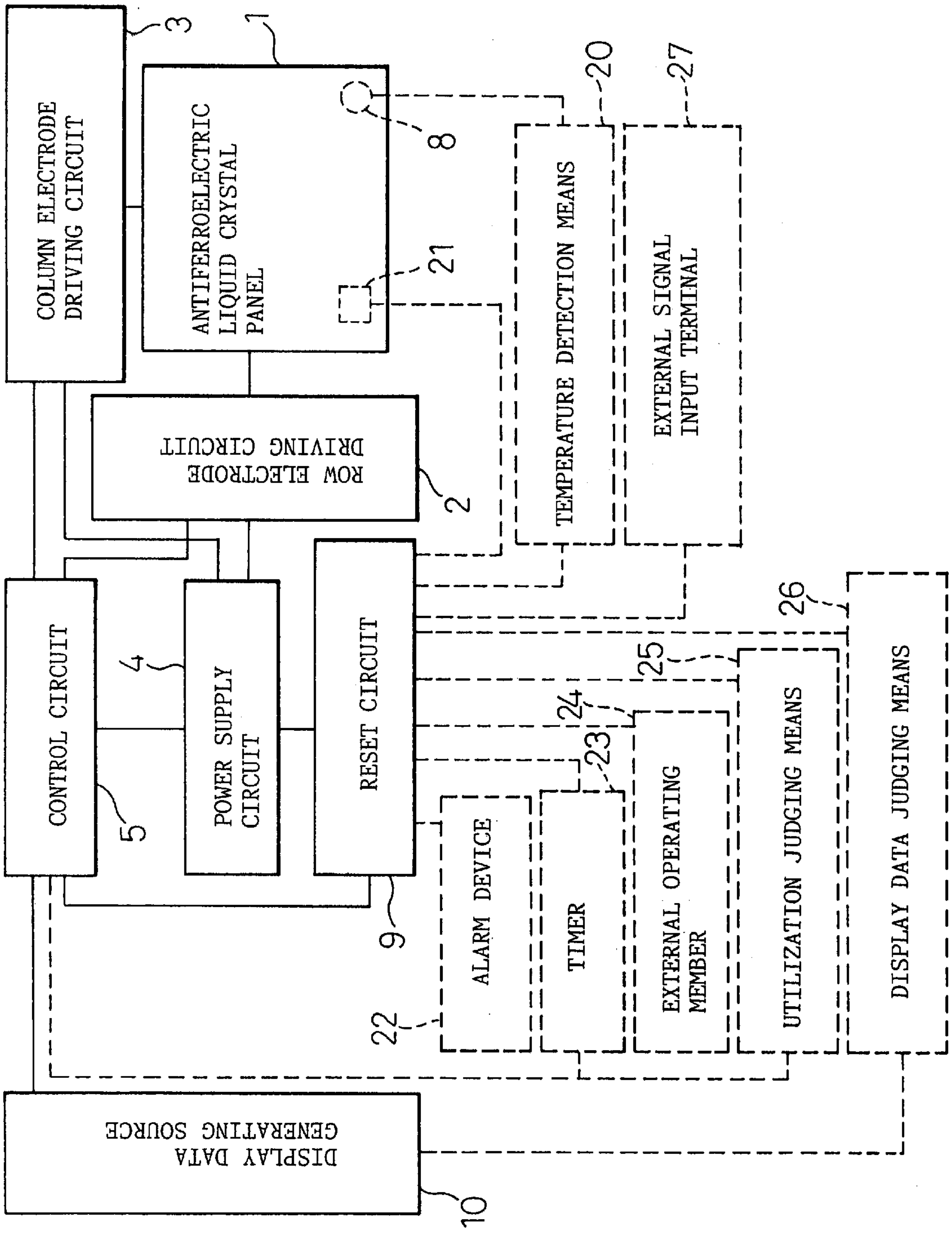
FIG. 9 is a diagram showing in simplified form the configuration of a second embodiment of the present invention.

FIG. 9 is a diagram showing in simplified form the configuration of a second embodiment of the present invention. In FIG. 9, a liquid crystal panel 1 is connected to a row electrode driving circuit 2 and a column electrode driving circuit 3. The row electrode driving circuit 2 and the column electrode driving circuit 3 are connected to a control circuit 5 which, in turn, is connected to a display data generating source 10. A reset circuit 9 connected to the control circuit 5 is provided to carry out the present invention. A power supply circuit 4 supplies power as needed to various blocks (for example, the control circuit 5, the row electrode driving circuit 2, the column electrode driving circuit 3, the reset circuit 9, and optional elements). One or more of the following elements can be connected as options to the reset circuit 9.

(1) Temperature detection means 20 for detecting and judging panel temperature using a temperature sensor 8 provided to detect the temperature of the liquid crystal panel (2) Brightness detection means 21
(3) Alarm device 22
(4) Timer 23
(5) External operating member 24
(6) Utilization judging means 25
(7) Display data judging means 26
(8) External signal input terminal 27

An explanation of the above optional elements will be given later, but it should be noted here that the normalization processing of the present invention is performed by the reset circuit 9 based on the outputs (including combinations thereof) of the optional elements (1), (2), (4), (5), (6), (7), and (8).

Figure 10:
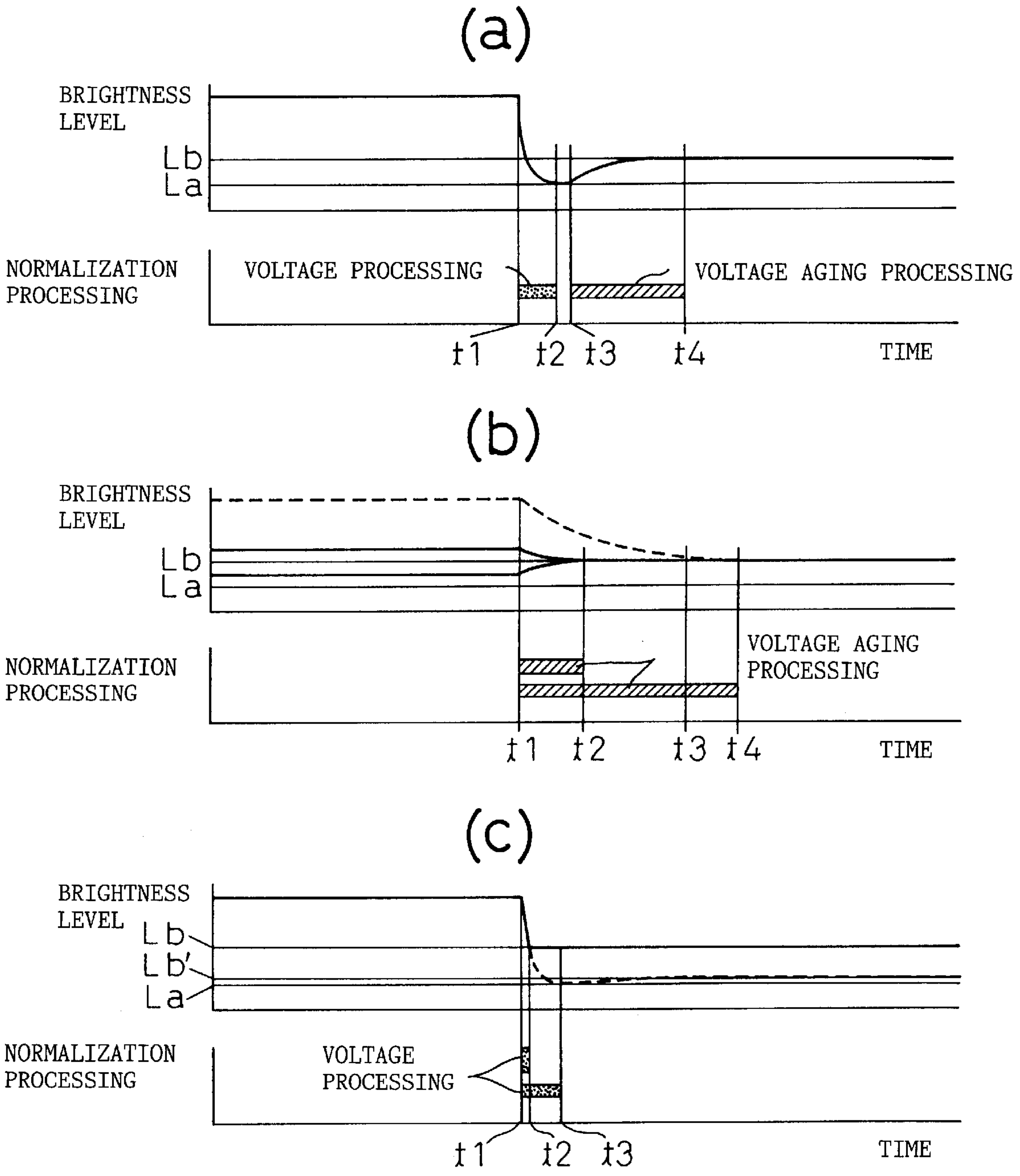
FIGS. 10(*a*), 10(*b*), and 10(*c*) are a diagram showing third to fifth embodiments of the present invention.

FIG. 10(*a*) is a diagram showing a third embodiment of the present invention, based on the configuration of FIG. 9. In FIG. 10(*a*), it is assumed that the temperature of the liquid crystal panel will remain unchanged. It is also assumed that, at time t1, some of the liquid crystal pixels are at a level much higher than the aging brightness level. When the normalization processing is initiated at time t1 based on the outputs of the optional elements, the reset circuit 9 first applies a voltage processing waveform for about 10 seconds from time t1 to time t2 via the row and column electrodes. At time t2, the base brightness of the liquid crystal panel reaches the minimum level (La). Thereafter, for a period from time t3 (this may be the same as time t2) to time t4, voltage aging processing is performed. The base brightness at the minimum brightness level (La) now increases with each application of the aging waveform and, at time t4, reaches saturation at the aging brightness level (Lb).

When the same pattern is displayed on the liquid crystal panel after the voltage aging processing, pixels displayed continuously in the dark state remain in the antiferroelectric state, and the base brightness of such pixels, therefore, remains unchanged at Lb. For pixels displayed continuously in the bright state, on the other hand, the behavior of the liquid crystal changing from the ferroelectric state back to the antiferroelectric state is repeated, but since the base brightness is already saturated, it is still maintained at Lb. That is, since there is no difference in the base brightness between the pixels displayed continuously in the dark state and the pixels displayed continuously in the light state, the white brightening phenomenon does not occur, and thus a good antiferroelectric liquid crystal display apparatus free from burn-in can be provided.

In the third embodiment, the voltage aging processing is performed after setting the liquid crystal in the initial state by performing the voltage processing, but only the voltage aging processing may be performed by omitting the voltage processing. FIG. 10(*b*) is a diagram showing a fourth embodiment employing this latter method. This method requires a longer time for the normalization processing compared with the method of the foregoing third embodiment when the liquid crystal panel contains pixels whose base brightness is much higher than the aging brightness level, as shown by the dashed line in FIG. 10(*b*). On the other hand, when the base brightness of all the pixels is at or near the aging brightness level, as shown by the solid line in FIG. 10(*b*), the time for the normalization processing can be shortened.

FIG. 10(*c*) is a diagram showing a fifth embodiment of the present invention. When the change caused in the base brightness by the normalization processing is limited to the direction that decreases the base brightness, by controlling the duration of the voltage processing time the normalization processing can be accomplished by only performing the voltage processing without having to perform the voltage aging processing. More specifically, the purpose can be accomplished by stopping the voltage processing at time t2 when the base brightness reaches the aging brightness level Lb during the voltage processing, as shown by the solid line in FIG. 10(*c*).

Further, as previously described, in some liquid crystal panels, the minimum brightness level (La) is almost the same as the aging brightness level (Lb'). Since such liquid crystal panels are inherently free from the burn-in due to the white brightening phenomenon, there are cases where a sufficiently good display quality, as shown by the dashed line in FIG. 10(*c*), can be obtained without performing the aging processing but by performing only the voltage processing as the normalization processing and holding the base brightness at the minimum brightness level. Therefore, the normalization processing should be interpreted to include the case where only the voltage processing is performed.

Figure 11:
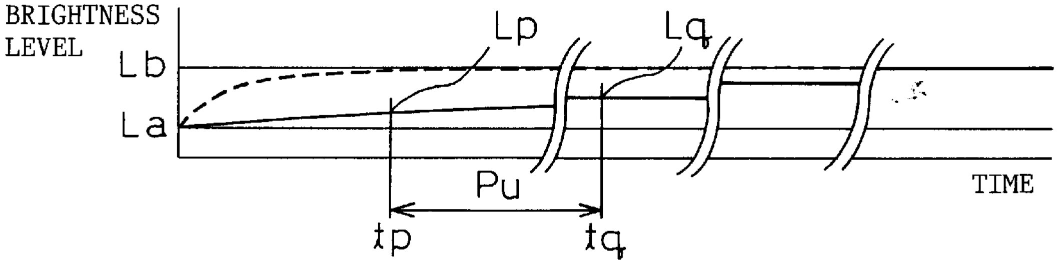
FIGS. 11(*a*) and 11(*b*) are a diagram showing a sixth embodiment of the present invention.
Figure 11:
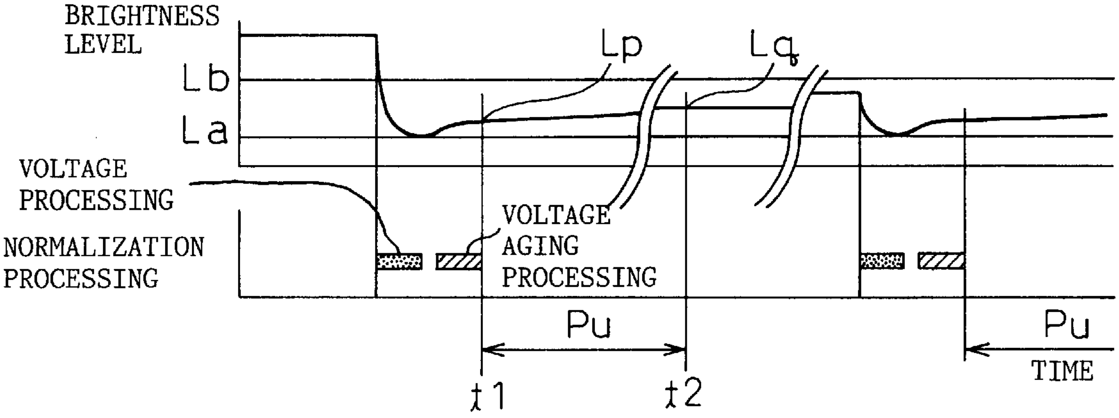

FIG. 11 is a diagram showing a sixth embodiment of the present invention. Since the characteristics of liquid crystal panels differ depending on the liquid crystal material used, when a white display is produced continuously starting from the state of the initial base brightness at La, as shown in FIG. 11(*a*), for example, the time required for the base brightness to reach saturation at Lb may differ even for liquid crystal panels having the same minimum brightness level La and the same, relatively high aging brightness level Lb. In the case of the liquid crystal panel having the characteristic shown by the dashed line in FIG. 11(*a*), the base brightness changes within a relatively short time, so that the burn-in phenomenon tends to occur in a relatively short time. On the other hand, in the case of the liquid crystal panel having the characteristic shown by the solid line in FIG. 11(*a*), since the base brightness changes over a relatively long time, the burn-in phenomenon does not occur until after a relatively long time has elapsed. The embodiments shown in FIGS. 10(*a*) and 10(*b*) can, of course, be applied effectively to these liquid crystal panels. In that case, however, when the normalized level, which is the level of the base brightness obtained by the normalization processing, is set to Lb, if Lb is at a high level, the contrast will decrease because the optical transmittance in the black display state depends on the base brightness. It is therefore desirable that the normalized level be set at as low a level as possible.

Now, suppose the liquid crystal panel having the characteristic shown by the solid line in FIG. 11(*a*) is used. In many display apparatuses, the period (Pu) during which the panel needs to be driven continuously in the ordinary selection display mode is not very long. In many cases, such a period continues, for example, for 10 hours or from 7 a.m. to 11 p.m. On the other hand, if there occurs a difference in the base brightness, a slight difference will not be recognizable as burn-in to the human eye, as will be described later. When the limit value of this base brightness difference is denoted by dk (hereinafter called the "allowable brightness difference), if the change of the base brightness that occurs during the period Pu is less than dk, the burn-in phenomenon does not become a problem. Therefore, if within the period Pu, starting at time tp (the base brightness level at this time is denoted by Lp) and ending at time tq (the base brightness level at this time is denoted by Lq), the characteristic shown by the solid line in FIG. 11(*a*) contains a portion where Lq−Lp is less than dk, no practical problem will occur if Lp is set as the normalized level.

That is, in FIG. 11(*b*), prior to time t1 at which a continuous selection display begins to be produced on the display apparatus, the normalization processing is performed so that the base brightness is brought to Lp at time t1. As is apparent from the above assumption, if there are pixels driven continuously in a white mode during the period Pu from time t1 to time t2, since the amount of change of the base brightness of such pixels is less than dk, burn-in does not become a problem.

The value of Lp can be set at an optimum level between the minimum brightness level and the aging brightness level. With this method, a display apparatus free from burn-in can be provided while minimizing the decrease in the contrast. It may also become possible to shorten the time required for the normalization processing. That is, the normalized level in the present invention is not limited to the aging brightness level but can be set at an optimum level between the minimum brightness level and a level approximately equal to the aging brightness level. Of course, even in the same liquid crystal panel, the normalized level may become equal to the minimum level or approximately equal to the aging brightness level, depending on the length of the period Pu.

FIG. 11(*b*) shows an example in which both the voltage processing and voltage aging processing are performed as the normalization processing, but it will be appreciated that only the voltage aging processing or only the voltage processing may be performed. In either case, however, when the value of Lp is different from La or Lb, the length of time during which the processing is performed must be controlled so that the base brightness is brought to Lp at time t1. Further, when temperature control means for controlling the temperature of the liquid crystal panel is provided, as will be described later, temperature aging processing can also be utilized.

The third to sixth embodiments work effectively to prevent burn-in due to the white brightening or white darkening phenomenon in an environment where the temperature of the liquid crystal panel is maintained constant (for example, an environment where the entire display apparatus is placed in a thermostatic chamber and the power supply is maintained ON) or in an environment where temperature changes occur only in a direction that increases the interlayer spacing of the liquid crystal molecules during operation. However, if the liquid crystal panel is operated in an environment where temperature changes occur in the panel, there arises the possibility that burn-in of the white darkening phenomenon may occur. This will be described in detail below.

Burn-in of the white darkening phenomenon occurs due to an irreversible change caused in the base brightness by the liquid crystal molecular structure changing from the bookshelf structure to the chevron structure when the interlayer spacing is reduced because of a temperature change, as previously described. When the relationship between the change of the base brightness and the interlayer spacing was examined, it was found that the allowable brightness difference dk, the limit value of the brightness level difference unrecognizable as burn-in to the human eye, was approximately equal to two levels (about 1% in terms of optical transmittance) in FIG. 7, and that one level in FIG. 7 would correspond to about 0.1 Angstrom (Å) in terms of the amount of change of the interlayer spacing. Therefore, in this liquid crystal panel, a display practically free from discernible burn-in can be produced if the amount of change of the interlayer spacing is 0.2 Å or less.

Next, embodiments of the present invention using the relationship between the interlayer spacing and temperature change will be described in detail.

A description will be given first of a procedure for obtaining the allowable operating temperature range of the liquid crystal panel from the temperature versus interlayer spacing characteristic diagram with reference to FIG. 5. Consider the case where it is desired to operate this liquid crystal panel at temperatures around 30° C. (there are cases where the temperature cannot be raised too high for various reasons). Assuming that the allowable amount of interlayer spacing change (hereinafter denoted dD) is 0.1 Å, for example, in FIG. 5 the difference between the interlayer spacing at 27° C. (32.25 Å) and that at 34° C. (32.15 Å) is exactly equal to 0.1 Å. It is therefore seen that the temperature range from 27° C. to 34° C. should be set as the allowable temperature range. Denoting the center of the allowable temperature range as Tg, and the width of the allowable temperature change as 2*dT, then Tg=30.5 and dT=3.5. Accordingly, when the normalization processing such as the voltage aging processing is performed at 30.5° C. on this liquid crystal panel, and thereafter the panel is used in an environment where the temperature can be maintained within the range of 27° C. to 34° C., a good display free from burn-in due to the white darkening or white brightening phenomenon can be maintained without specifically controlling the temperature of the liquid crystal panel, since a temperature change within that range does not cause burn-in discernible to the human eye.

In the above procedure, the allowable temperature range is determined from the interlayer spacing, but it is obvious that the operating temperature can also be determined from the brightness level shown in FIG. 6. In that case, the normalization processing is performed at the operating temperature, the brightness due to the temperature history is measured, and the temperature range within which the difference in brightness is indiscernible is determined as the allowable temperature range. Further, the allowable amount of interlayer spacing change is not limited to the specific value of 0.1 Å used in the above procedure. Since the above procedure is for determining the amount of interlayer spacing change within which the difference in brightness is generally not discernible, the value may be different for other liquid crystal panels. For the particular liquid crystal panel used in the present invention, the limit value of dD was 0.2 Å.

In the case of the liquid crystal panel having the temperature versus interlayer spacing characteristic shown in FIG. 5, if greater freedom can be allowed in the operating temperature range, the liquid crystal panel can be used in a region where the interlayer spacing change versus the temperature change ($|\Delta d/\Delta t|$) is smaller. In the case of FIG. 5, a maximum allowable temperature range of 40° C. to 60° C. can be obtained near the inflection point in the interlayer spacing range of 31.95 Å to 32.05 Å. Denoting the center of the allowable temperature range as Th, and the width of the allowable temperature change as 2*dT', then Th=50 and dT'=10. Accordingly, if the liquid crystal panel is subjected to the normalization processing at 50° C., then as long as the liquid crystal panel is used in an environment where the temperature of the liquid crystal panel can be maintained within the range of 40° C. to 60° C., a good display can be maintained without specifically controlling the temperature of the liquid crystal panel. In this way, a good antiferroelectric liquid crystal display apparatus can be provided that has a wide operating temperature range and that is free from burn-in of the white darkening phenomenon.

In this case also, it is apparent that the allowable temperature range can be determined from the difference in brightness level, rather than determining it from the interlayer spacing. This, however, requires performing the normalization processing at each temperature and plotting the temperature history versus brightness level change graph shown in FIG. 6; therefore, it can be said that the method that determines the temperature range from the interlayer spacing is easier.

The temperature versus interlayer spacing characteristic of FIG. 5 differs depending the liquid crystal material used, etc. For example, the inflection point of the interlayer spacing change versus the temperature may be higher or lower than that shown in FIG. 5, depending on the liquid crystal material used. Therefore, if the present invention is carried out by using, for example, a liquid crystal panel having the inflection point of the temperature versus interlayer spacing characteristic in the vicinity of 40° C. and by setting the center operating temperature at 40° C., a good display apparatus can be provided that is free from burn-in of the white brightening or white darkening phenomenon within the temperature range of 30° C. to 50° C.

Figure 12:
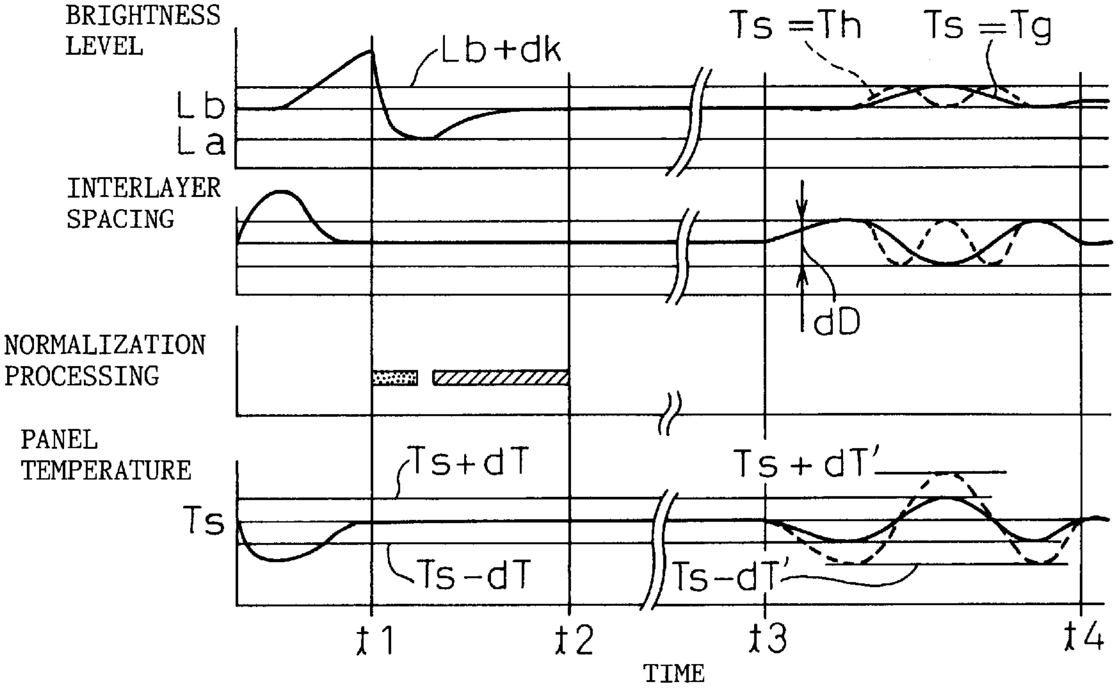
FIG. 12 is a diagram showing a seventh embodiment of the present invention.

FIG. 12 is a diagram showing a seventh embodiment of the present invention. In this embodiment, at least the temperature detection means 20, of the optional elements shown in FIG. 9, is used. The temperature detection means 20 monitors the temperature of the liquid crystal panel 20 to check whether it is within the allowable temperature range, and stores a record if it goes outside the allowable temperature range. Then, upon detecting at time t1 that the panel temperature has settled back at or near the center (Ts) of the allowable temperature range, the temperature detection means 20 directs the reset circuit 9 to initiate the normalization processing. The reset circuit 9 then performs the normalization processing from time t1 to time t2.

Suppose here that the temperature of the liquid crystal panel has undergone fluctuations during an interval from time t3 to time t4. If Ts is Tg in FIG. 5 then, if the panel temperature is within the range of Ts±dT as shown by the solid line in FIG. 12, and if Ts is Th in FIG. 5, then if the panel temperature is within the range of Ts±dT as shown by the dashed line in FIG. 12, the base brightness level does not exceed Lb+dK and burn-in does not become a problem.

In the following description, it is assumed that the liquid crystal panel has the characteristic shown in FIGS. 5 to 7, and that the center operating temperature (set temperature) Ts is Th (50° C.) and the ambient temperature To is lower than Ts. Further, though the normalized level can be set at an optimum level between the minimum brightness level and a level approximately equal to the aging brightness level, as earlier described, the following description assumes that the normalized level is set equal to the aging brightness level. Of course, these conditions are not specifically limited.

Figure 13:
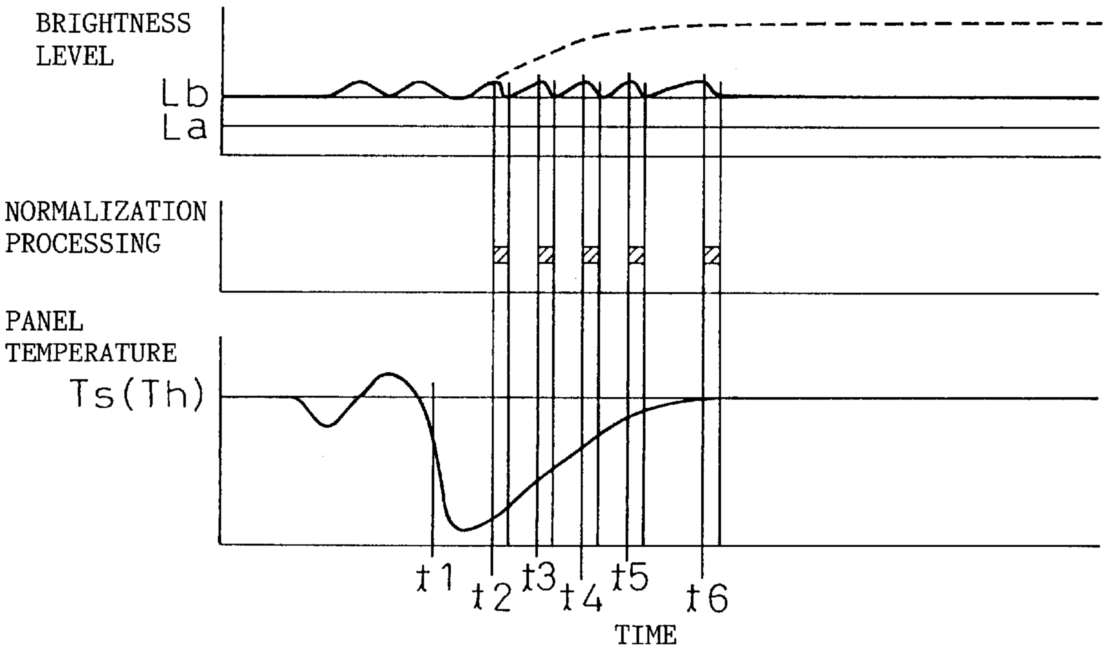
FIG. 13 is a diagram showing an eighth embodiment of the present invention.

FIG. 13 is a variation diagram showing an eighth embodiment of the present invention. If the temperature of the liquid crystal panel changes before time t1, burn-in will not become a problem, as described above, as long as the temperature stays within the allowable temperature range. However, if the temperature of the liquid crystal panel falls below the lower limit of the allowable range at time t1 and thereafter increases, some of the molecules change from the bookshelf structure to the chevron structure. The change in the base brightness caused by this structural change is irreversible; that is, as shown by the dashed line in FIG. 13, the base brightness increases beyond the initial aging brightness level even if the temperature of the liquid crystal panel returns to the set temperature Ts at time t6. If this condition continues for a long period of time, a difference will occur in the base brightness level between pixels that are mostly displayed in the bright state and pixels that are not, and the burn-in phenomenon will become discernible.

To avoid this, when the temperature detection means 20 in FIG. 9 has detected such a temperature change that will cause an irreversible change in the base brightness, or when the brightness detection means 21 (describe later) in FIG. 9 has detected the possibility of burn-in, the normalization processing is performed automatically. By so doing, excess molecules that have changed to the chevron structure are forced to change back to the bookshelf structure, the irreversible base brightness rise is corrected, and when the temperature of the liquid crystal panel returns to the set temperature Ts at time t6, the base brightness also returns to the original aging brightness level.

FIG. 13 has shown the case where as the normalization processing the voltage aging processing is performed in a distributed manner. It will, however, be appreciated that the processing may be performed in a continuous manner, and the voltage processing may be included in the series of processing. Further, if the necessary processing cannot be completed while the temperature is changing, the normalization processing may be continued after the temperature has settled at the set temperature.

Figure 14:
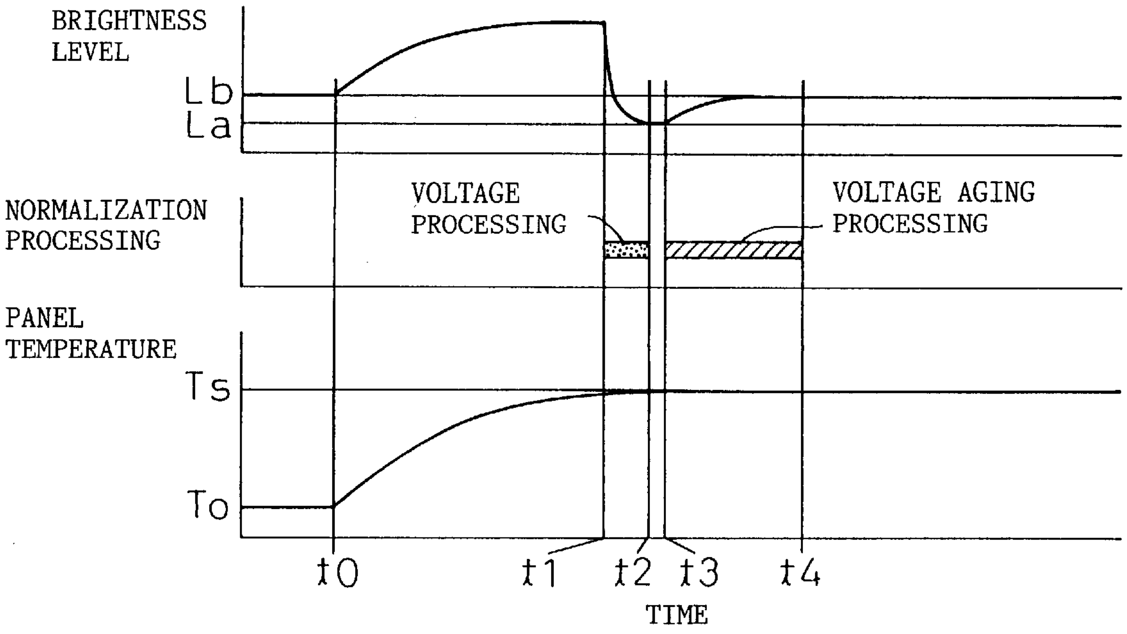
FIG. 14 is a diagram showing a ninth embodiment of the present invention.

FIG. 14 shows a ninth embodiment of the present invention. When power is turned on to the liquid crystal display apparatus at time t0, the temperature of the liquid crystal panel begins to rise because of the heat of the backlighting and the heat generated from within the entire apparatus. By incorporating a thermal design into the apparatus, if the room temperature To is constant the apparatus can be designed so that the temperature of the liquid crystal panel saturates at or near the temperature Ts which is higher than To. When the temperature detection means 20 in FIG. 9 detects, based on the temperature information from the temperature sensor 8, that the temperature of the liquid crystal panel has reached the set temperature Ts at time t1, the reset circuit 9 directs the control circuit 5 to perform the voltage processing by applying a voltage without a relaxation period (for example, the voltage shown in FIG. 3) to the liquid crystal panel for a predetermined period of time. At time t2 at the end of the predetermined period of time, the base brightness of the liquid crystal panel is at the minimum brightness level (La). Thereafter, at time t3 (t3 may be set at the same point as t2), the reset circuit 9 directs the control circuit 5 to perform the voltage aging processing by applying a voltage having a relaxation period (for example, the voltage shown in FIG. 8) to the liquid crystal panel for a predetermined period of time. At time t4 at the end of the predetermined period of time, the base brightness of the liquid crystal panel is at the aging brightness level (Lb). As long as the temperature of the liquid crystal panel is maintained in the vicinity of Ts after time t4, the burn-in phenomenon does not become a problem, as already explained.

During the voltage processing or voltage aging processing, pixels being subjected to the processing cannot be driven in the normal display mode.

In the above explanation, time t1 has been described as being the time when the temperature of the liquid crystal panel is detected reaching the set temperature Ts, but in practice, it is sufficient that the temperature of the liquid crystal panel reaches the set temperature Ts by time t2 when the voltage processing is complete. Therefore, the following control method may be employed.

In FIG. 14, when power is turned on to the liquid crystal display apparatus at time t0, the temperature of the liquid crystal panel rises toward the set temperature Ts. At time t1, the reset circuit 9 directs the control circuit 5 to initiate the voltage processing of the liquid crystal panel. Upon detecting at time t2 that the temperature of the liquid crystal panel has reached the set temperature Ts, the reset circuit 9 directs the control circuit 5 to terminate the voltage processing of the liquid crystal panel. At time t2, the base brightness of the liquid crystal panel is at the minimum brightness level (La).

Thereafter, at time t3 (t3 may be set at the same point as t2), the reset circuit 9 directs the control circuit 5 to perform the voltage aging processing for a predetermined period of time. At time t4 at the end of the predetermined period of time, the base brightness level of the liquid crystal panel is at the aging brightness level (Lb). As long as the temperature of the liquid crystal panel is maintained in the vicinity of Ts after time t4, the burn-in phenomenon does not become a problem, as already explained. In this case, as long as the base brightness of the liquid crystal panel can be brought to the minimum brightness level by the voltage processing during the period t2–t1, the value of t1 can be set freely; for example, t1 may be set at the same point as t0. It is also possible to set t1 as the time when the temperature detection means 20 detects, based on the temperature information from the temperature sensor 8, that the temperature of the liquid crystal panel has reached Ts–Tr (where Tr is any suitable value greater than 0).

Further, if the time that the temperature of the liquid crystal panel reaches the vicinity of Ts after power on is predictable, means for detecting the temperature of the liquid crystal panel need not be provided, and the time from t1 to t4 can be set in advance to a suitable value. The timer 23 in FIG. 9 can be used for this purpose. The same applies to the embodiments hereinafter described.

Figure 15:
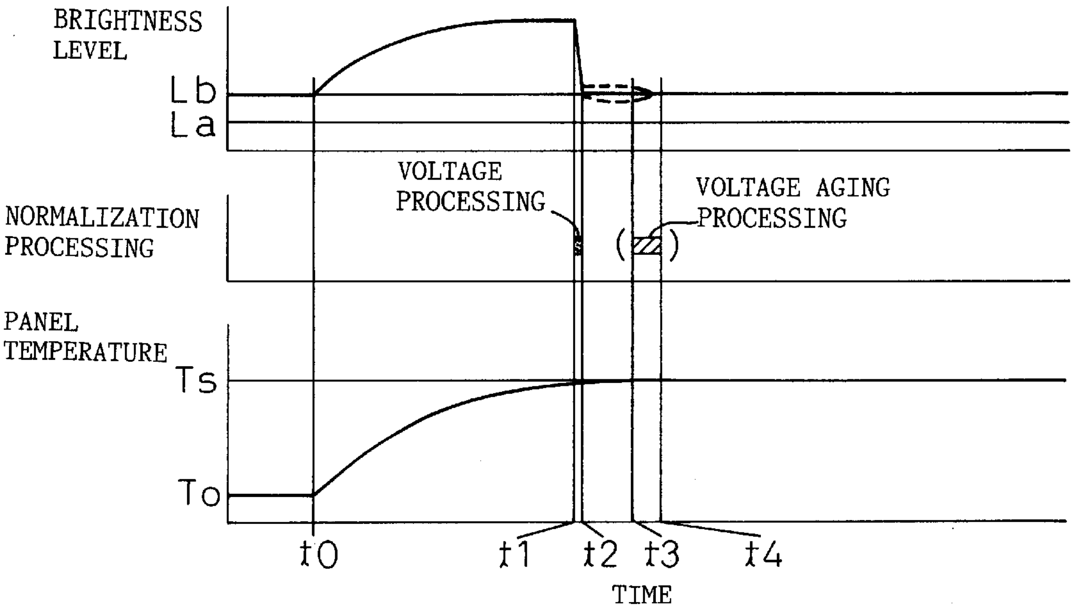
FIG. 15 is a diagram showing a 10th embodiment of the present invention.

FIG. 15 shows a 10th embodiment of the present invention. When power is turned on to the liquid crystal display apparatus at time t0, the temperature of the liquid crystal panel rises toward the set temperature Ts. Upon detecting at time t1 that the temperature of the liquid crystal panel has reached the set temperature Ts, the reset circuit 9 directs the control circuit 5 to perform the voltage processing of the liquid crystal panel for a predetermined period of time predicted to be necessary to bring the base brightness of the liquid crystal panel to the aging brightness level (Lb).

If the base brightness of the liquid crystal panel is brought to the aging brightness level (Lb) within tolerance by time t2 at the end of the predetermined period of time, the burn-in phenomenon does not become a problem as long as the temperature of the liquid crystal panel is maintained in the vicinity of Ts after time t2, as previously described.

However, depending on the characteristic specific to each individual liquid crystal panel, etc., there can occur cases where the base brightness of the liquid crystal panel cannot be brought correctly to the aging brightness level at time t2, as shown by the dashed lines in FIG. 15. In such cases, provisions may be made so that thereafter at time t3 (t3 may be set at the same point as t2), the reset circuit 9 directs the control circuit 5 to apply voltage aging processing to the liquid crystal panel for a predetermined period of time. At time t4 at the end of the voltage aging processing, the base brightness of the liquid crystal panel is at the aging brightness level (Lb). As long as the temperature of the liquid crystal panel is maintained in the vicinity of Ts after time t2, the burn-in phenomenon does not become a problem, as already explained.

According to the embodiment shown in FIG. 15, the time required for the normalization processing can be significantly reduced compared with the embodiment shown in FIG. 14. Since a normal display cannot be produced during the normalization processing which is performed by applying a voltage, reducing the time required for the normalization processing offers a great benefit.

Figure 16:
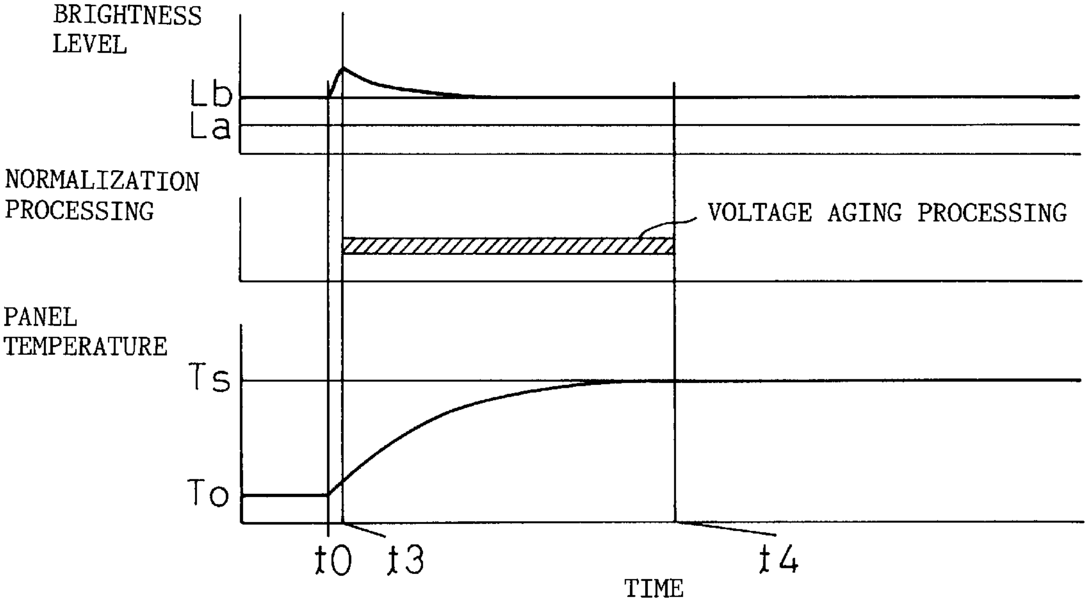
FIG. 16 is a diagram showing an 11th embodiment of the present invention.

FIG. 16 shows an 11th embodiment of the present invention. When power is turned on to the liquid crystal display apparatus at time t0, the temperature of the liquid crystal panel rises toward the set temperature Ts. At time t3 (t3 may be set at the same point as t0), the reset circuit 9 directs the control circuit 5 to initiate the voltage aging processing of the liquid crystal panel.

Upon detecting at time t4 that the temperature of the liquid crystal panel has reached the set temperature Ts, the reset circuit 9 directs the control circuit 5 to terminate the voltage aging processing of the liquid crystal panel and drive the panel in the normal display mode. Since the temperature of the liquid crystal panel is maintained at Ts after time t4, the burn-in phenomenon does not occur, as already explained.

This embodiment has the disadvantage that the normalization processing time becomes longer compared with the embodiments shown in FIGS. 14 and 15, but offers the advantage of simplifying the circuit configuration.

The embodiments shown in FIGS. 14, 15, and 16 have been described in relation to the power on at time t0, but it is apparent that these embodiments can also be applied, regardless of whether the power is turned on or not, in situations where the temperature of the liquid crystal panel has changed largely before t1, giving rise to the possibility of burn-in.

In the embodiment shown in FIG. 9, since means for controlling the temperature of the liquid crystal panel 1 is not provided, there can occur cases, depending on the operating environment, where the liquid crystal panel is subjected to frequent temperature changes that can cause interlayer spacing changes greater than the allowable value. In such cases, the problem of burn-in can, of course, be solved by applying the embodiments shown in FIGS. 13 to 16. This may, however, pose another problem in a display apparatus, since during the normalization processing, which is performed by applying a voltage, the screen of the liquid crystal panel is held in the bright state and cannot be driven in the normal display mode. It is therefore desirable to provide means for controlling the temperature of the liquid crystal panel.

Figure 17:
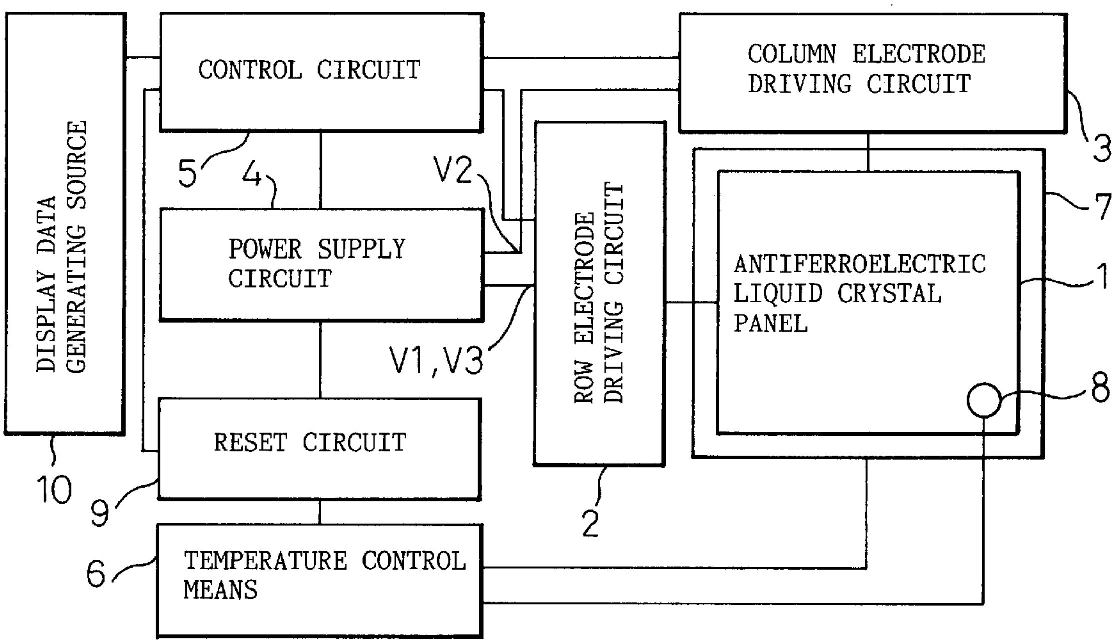
FIG. 17 is a diagram showing a 12th embodiment of the present invention.

FIG. 17 is a diagram showing in simplified form the configuration of a 12th embodiment of the present invention. In FIG. 17, a liquid crystal panel 1 is connected to a row electrode driving circuit 2 and a column electrode driving circuit 3. The row electrode driving circuit 2 and the column electrode driving circuit 3 are connected to a control circuit 5 which, in turn, is connected to a display data generating source 10. To carry out the present invention, a temperature varying means 7 and a temperature sensor 8 are attached to the liquid crystal panel 1, and further, a temperature control means 6 and a reset circuit 9 are provided. The temperature varying means 7 and the temperature sensor 8 are connected to the temperature control means 6 which, in turn, is connected to the reset circuit 9. The reset circuit 9 is connected to the control circuit 5. A power supply circuit 4 supplies power as needed to various blocks (for example, the control circuit 5, the row electrode driving circuit 2, the column electrode driving circuit 3, the reset circuit 9, and the temperature control means 6). In FIG. 17, power to the temperature varying means 7 is supplied via the reset circuit 9 and temperature control means 6.

In the configuration shown in FIG. 17, the temperature varying means 7 can be constructed using, for example, a transparent heater, a heater placed behind a backlight, the backlight itself, a simple fan, a warm air circulator, a cool air circulator, or any suitable combination thereof; alternatively, the liquid crystal panel may be placed in an air-conditioned box, that is, any means capable of managing the temperature of the liquid crystal panel can be used.

Figure 18:
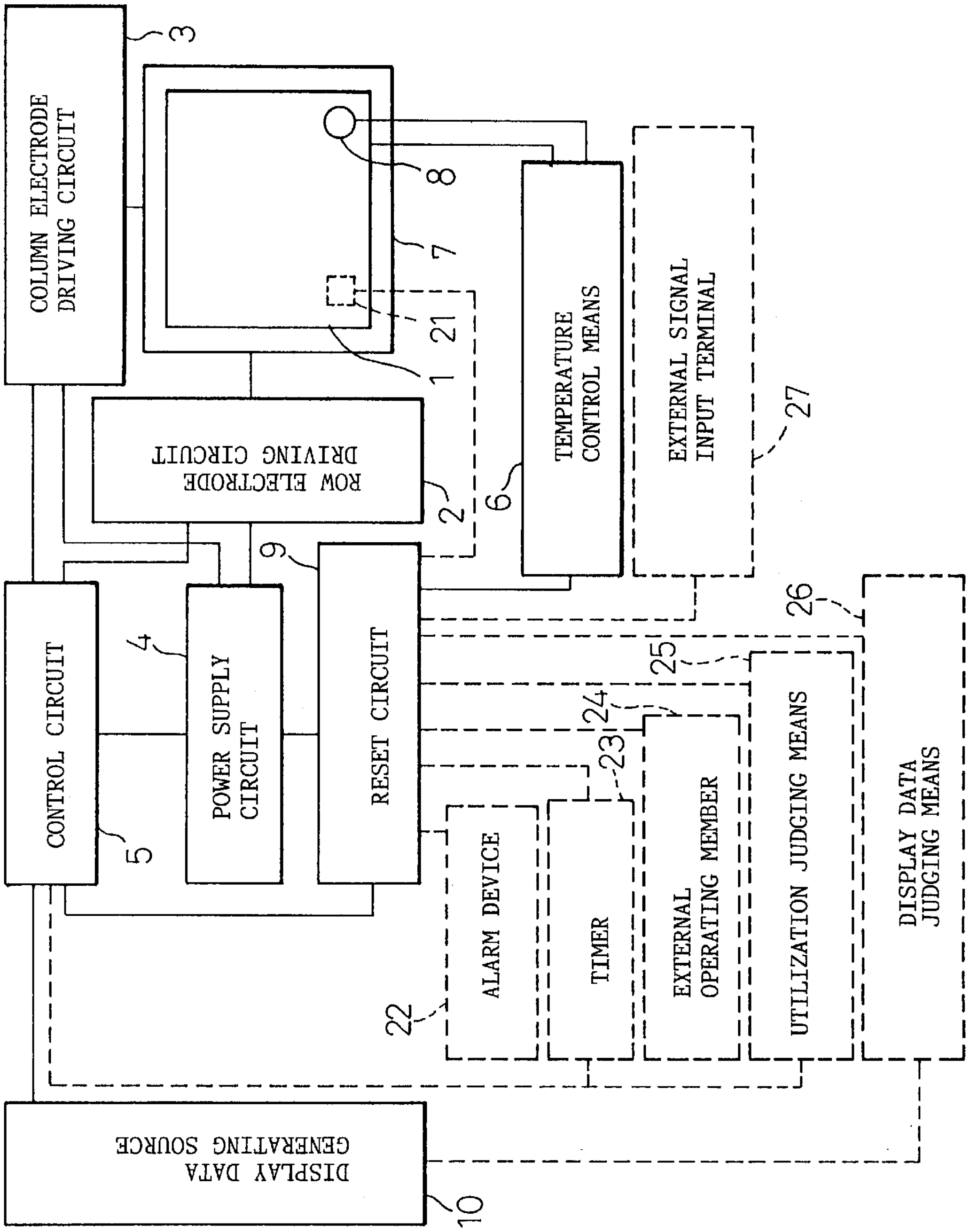
FIG. 18 is a diagram showing the 12th embodiment of the present invention.

The temperature control means 6 operates to maintain the temperature of the liquid crystal panel 1 at the set temperature in cooperation with the temperature varying means 7 and temperature sensor 8. All the optional elements shown in FIG. 9 can be attached to the reset circuit 9, as shown in FIG. 18. In the following description, however, it is assumed that the function of the temperature detection means 20 shown in FIG. 9 is incorporated in the temperature control means 6.

The embodiments shown in FIGS. 10 to 16 can all be applied to the configuration shown in FIGS. 17 and 18. For example, the embodiments shown in FIGS. 12 and 13 can be applied when the temperature of the liquid crystal panel varies because of insufficient performance of the temperature control means 6.

The embodiments shown in FIGS. 10 to 16 as applied to the configuration of FIGS. 17 and 18 will be described below by taking the embodiment shown in FIG. 14 as a representative example.

In FIG. 14, when power is turned on to the liquid crystal display apparatus at time t0, the temperature control means 6, based on the temperature information from the temperature sensor 8, drives the temperature varying means 7 so that the temperature of the liquid crystal panel 1 is brought to the set temperature Ts. Upon detecting at time t1 that the temperature of the liquid crystal panel has reached the set temperature Ts, the reset circuit 9 directs the control circuit 5 to perform the voltage processing by applying a voltage without a relaxation period (for example, the voltage shown in FIG. 3) to the liquid crystal panel for a predetermined period of time. At time t2 at the end of the predetermined period of time, the base brightness of the liquid crystal panel is at the minimum brightness level (La). Thereafter, at time t3 (t3 may be set at the same point as t2), the reset circuit 9 directs the control circuit 5 to perform the voltage aging processing by applying a voltage having a relaxation period (for example, the voltage shown in FIG. 8) to the liquid crystal panel for a predetermined period of time. At time t4 at the end of the predetermined period of time, the base brightness of the liquid crystal panel is at the aging brightness level (Lb). As long as the temperature of the liquid crystal panel is maintained at Ts after time t4, the burn-in phenomenon does not occur, as previously explained.

In the above explanation, time t1 has been described as being the time when the temperature of the liquid crystal panel reaches the set temperature Ts, but in practice, it is sufficient that the temperature of the liquid crystal panel reaches the set temperature Ts by time t2 when the voltage processing is complete. Therefore, the following control method may be employed.

In FIG. 14, when power is turned on to the liquid crystal display apparatus at time t0, the temperature control means 6, based on the temperature information from the temperature sensor 8, drives the temperature varying means 7 so that the temperature of the liquid crystal panel 1 is brought to the set temperature Ts. At time t1, the reset circuit 9 directs the control circuit 5 to initiate the voltage processing of the liquid crystal panel. Upon detecting at time t2 that the temperature of the liquid crystal panel has reached the set temperature Ts, the reset circuit 9 directs the control circuit 5 to terminate the voltage processing of the liquid crystal panel. At time t2, the base brightness of the liquid crystal panel is at the minimum brightness level (La). Thereafter, at time t3 (t3 may be set at the same point as t2), the reset circuit 9 directs the control circuit 5 to perform the voltage aging processing for a predetermined period of time. At time t4 at the end of the predetermined period of time, the base brightness level of the liquid crystal panel is at the aging brightness level (Lb). Since the temperature of the liquid crystal panel is maintained at Ts after time t4, the burn-in phenomenon does not occur, as previously explained. In this case, as long as the base brightness of the liquid crystal panel can be brought to the minimum brightness level by the voltage processing during the period t2–t1, the value of t1 can be set freely; for example, t1 may be set at the same point as t0.

According to FIG. 7 previously given, it can be seen that if a liquid crystal panel whose operating temperature center Ts is set at 50° C., for example, is subjected to voltage processing at 50° C. and, thereafter, the temperature of the liquid crystal panel is lowered to 36° C. (or raised to 64° C.) and then raised (or lowered) back to 50° C., the base brightness settles at the aging brightness level (Lb). Therefore, such processing can be used instead of the voltage aging processing. In this case, since the liquid crystal panel can be driven in the normal display mode while the temperature of the liquid crystal panel is being varied, the problem that the normal display operation cannot be performed for a long period of time, as in the case of the voltage aging processing, can be avoided. In the above explanation, the temperature was varied after performing the voltage processing at 50° C., but the same result can be obtained if the temperature is first varied from 50° C. to 36° C. (64° C.) and the voltage processing is performed at that temperature before changing the temperature back to 50° C.

The processing in which a liquid crystal panel, whose base brightness is at a level (Lx) lower than the normalized level at temperatures (Tx) other than the set temperature, is subjected to a temperature change that causes the interlayer spacing to decrease, thereby bringing the base brightness to the normalized level, is hereinafter called the "temperature aging processing". It is also to be understood that the normalization processing includes this temperature aging processing (voltage processing and temperature changing).

Figure 19:
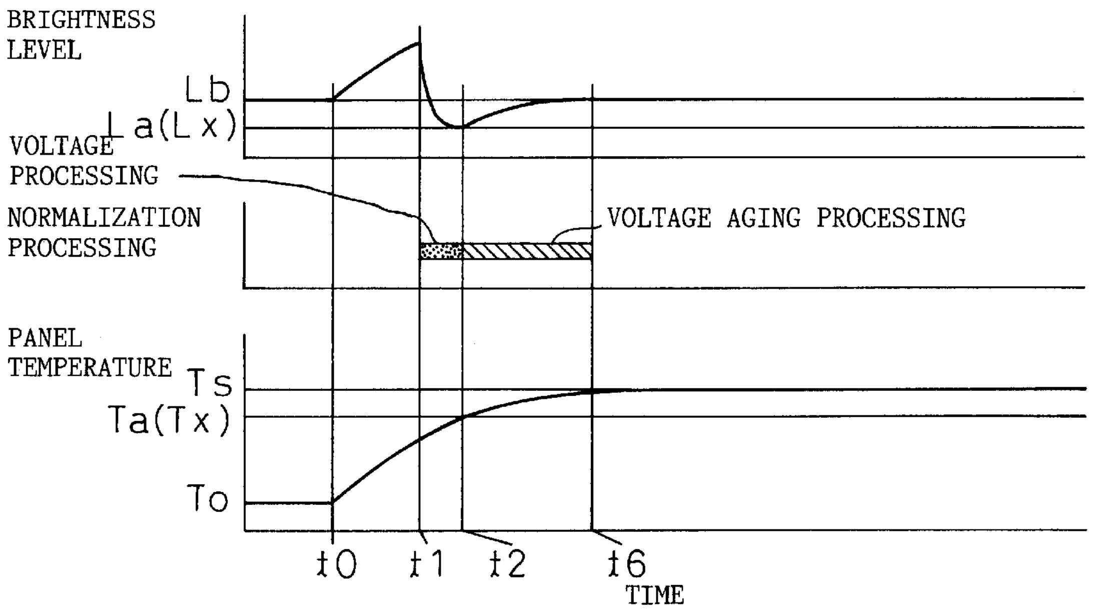
FIG. 19 is a diagram showing a 13th embodiment of the present invention.

FIG. 19 is a diagram showing a 13th embodiment which employs the temperature aging processing instead of the voltage aging processing. This embodiment can be implemented regardless of whether the temperature control means 6 is provided or not, but the following description deals with the case in which the temperature control means 6 is provided. The description also assumes the case of Lx=La and Tx=Ta.

When power is turned on to the liquid crystal display apparatus at time t0, the temperature control means 6, based on the temperature information from the temperature sensor 8, drives the temperature varying means 7 so that the temperature of the liquid crystal panel 1 is brought to the set temperature Ts. At time t1 (t1 may be set at the same point as t0), the reset circuit 9 directs the control circuit 5 to initiate the voltage processing of the liquid crystal panel.

Upon detecting at time t2 that the temperature of the liquid crystal panel has reached Ta, the reset circuit 9 directs the control circuit 5 to terminate the voltage processing of the liquid crystal panel and drive the panel in the normal display mode. At time t2, the base brightness of the liquid crystal panel is at the minimum brightness level (La). After time t2, the temperature of the liquid crystal panel continues to increase beyond Ta and reaches the set temperature Ts at time t6. If the base brightness of the liquid crystal panel is at the aging brightness level at time t6, since the temperature of the liquid crystal panel thereafter is maintained at Ts, the burn-in phenomenon does not occur, as previously explained. The temperature aging processing has thus been performed for the period from time t2 to time t6.

The value of Ta is obtained in advance using a characteristic diagram such as the one shown in FIG. 6 or 7. For example, when using the liquid crystal panel having the characteristic of FIG. 5 at 50° C. (Ts=50), FIG. 7 can be used directly, in which case Ta is 36° C. or 64° C.

In this embodiment, the period during which a normal display cannot be produced is from t1 to t2; after t2, the liquid crystal panel can be driven in the normal display mode.

It is apparent that the embodiment shown in FIG. 19, like the embodiments shown in FIGS. 14, 15, and 16, can also be applied, regardless of whether the power is turned on or not, in situations where the temperature of the liquid crystal panel has changed largely before t1, giving rise to the possibility of burn-in.

Figure 20:
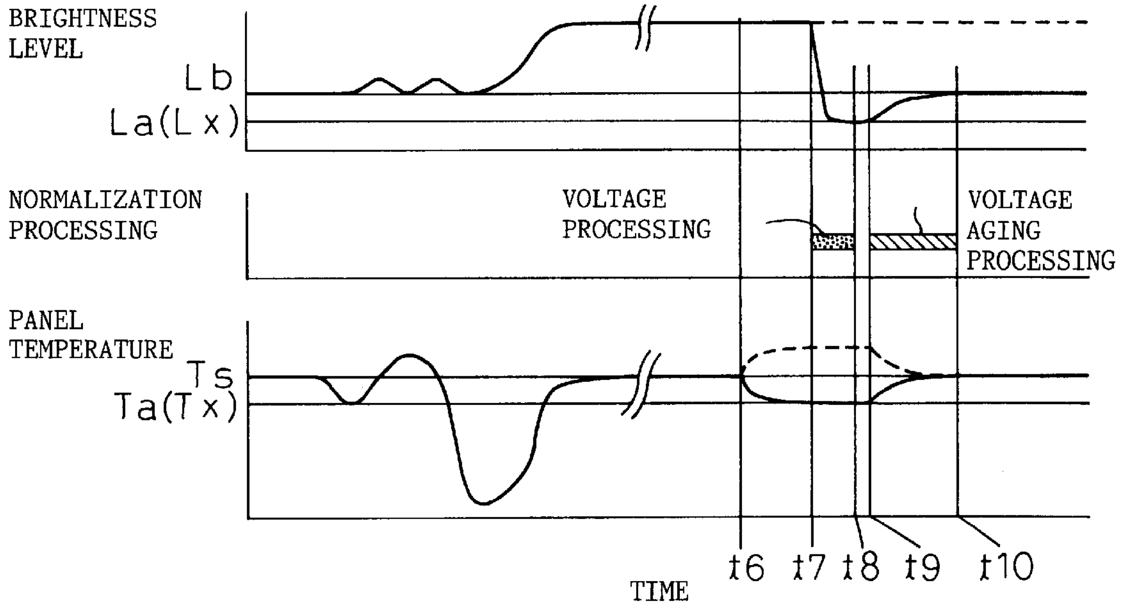
FIG. 20 is a diagram showing a 14th embodiment of the present invention.

When the temperature control means 6 is provided, the temperature aging processing can be performed by temporarily changing the control temperature of the temperature control means 6 to a temperature different from Ts. FIG. 20 illustrates a 14th embodiment implementing such processing.

In FIG. 20, the following assumption is used. That is, it is assumed that before time t6, a situation has occurred where the temperature control means 6 is unable to control the temperature of the liquid crystal panel to within the specified limits, giving rise to the possibility of burn-in. In this case, it may be possible to immediately perform the normalization processing using the method described in each of the foregoing embodiments, but since the liquid crystal panel cannot be driven in the normal display mode during the normalization processing, as already described, there are cases where it is not desirable to immediately initiate the normalization processing. In such cases, it is preferable to wait the normalization processing until convenient time t6. It is assumed that the initiation of the normalization processing is directed automatically or manually at time t6 (it is assumed that the temperature of the liquid crystal panel has returned to Ts by that time). Then, the temperature control means 6 lowers the temperature of the liquid crystal panel toward Ta. When the temperature of the liquid crystal panel reaches Ta at time t7, voltage processing is performed until t8. With this voltage processing, the base brightness of the liquid crystal panel settles at the minimum brightness level (La). At time t9 (t9 may be set at the same point as t8), the temperature control means 6 begins to raise the temperature of the liquid crystal panel toward the set temperature Ts, thereby initiating the temperature aging processing. When the temperature of the liquid crystal panel reaches the set temperature Ts at time t10, the base brightness is at the aging brightness level (Lb).

The temperature Ta here is the same as that described in the embodiment shown in FIG. 19. In the present embodiment also, Ts=50 as in the foregoing embodiment and, since the embodiment is directed to the liquid crystal panel having the characteristics shown in FIGS. 5 to 7, not only the method in which the temperature is lowered and then raised back to the set temperature, but also the method in which the temperature is raised beyond the set temperature and then lowered back to the set temperature, as shown by the dashed line in the panel temperature variation diagram of FIG. 20, can be employed for the temperature aging processing.

In the embodiment shown in FIG. 19 or 20, when the length of time required to bring the base brightness to a specific value Lx (La<Lx<Lb) lower than the aging brightness level by the voltage processing can be assumed substantially constant regardless of the level of the base brightness before the voltage processing, the time required for the voltage processing can be shortened by performing voltage processing similar to the embodiment shown in FIG. 15.

That is, in this case, there is no need to lower the base brightness down to the minimum brightness level by the voltage processing, but the voltage processing should only be performed for a period of time predicted to be necessary for the base brightness to decrease to Lx, and instead of the temperature Ta, temperature Tx should be used such that the base brightness at Lx is brought to La by the temperature aging processing.

In the explanation of the embodiments shown in FIGS. 14, 15, 16, and 19, it has been described that the normalization processing of the present invention is automatically performed in interlocking fashion with the power on operation of the liquid crystal display apparatus. It has also been described that these embodiments can also be carried out independently of the power on operation.

When these embodiments are carried out in interlocking fashion with the power on operation, it is considered that a situation where the burn-in phenomenon becomes a problem will not occur as long as the temperature of the liquid crystal panel is maintained within the allowable temperature range after the normalization processing. However, if the power is left on for a long period of time, for example, depending on the environment there occurs the possibility that the temperature of the liquid crystal panel cannot be maintained within the allowable temperature range, allowing the base brightness to change largely until the burn-in phenomenon becomes discernible; this possibility can occur not only when the temperature control means 6 is not provided but even when the temperature control means 6 is provided.

To address such situations, a means can be provided that automatically or manually carries out the present invention, regardless of the power on time, by using the optional elements shown in FIGS. 9 and 18 as necessary. Further, all the optional elements need not necessarily be used, but the brightness detection means 21, the alarm device 22, the timer 23, the external operating member 24, the utilization judging means 25, the display data judging means 26, the external input terminal 27 shown in FIGS. 9 and 18, or the temperature detection means 20 shown in FIG. 9, can be omitted depending on the mode of each embodiment.

Implementation of the present invention can be initiated by operating, for example, the external operating member 24 shown in FIGS. 9 and 18. Provisions can also be made to forcefully perform the normalization processing during a designated part of the day (for example, midnight) by using the timer 23. If the display apparatus is provided with the external signal input terminal 27 so that it can be controlled by external signals, provisions may be made to perform the normalization processing by using an external input signal. When using the apparatus for a specialized purpose, the display data judging means 26 for detecting, for example, whether display data (including data for turning on or off the liquid crystal pixels as a shutter) is a specific pattern (for example, a pattern to display all the pixels in the bright state) can be provided so that the normalization processing is performed based on the output of the display data judging means 26. Provisions may also be made to perform the normalization processing based on the output of the utilization judging means 25 which judges whether the display apparatus has remained in an unoperated condition for a specified period of time, like the screen saver function commonly used in personal computers.

As one method of detecting or judging the occurrence (or the possibility of the occurrence) of burn-in by the occurrence in the liquid crystal panel of a brightness difference exceeding the allowable brightness difference, the brightness detection means 21 can be provided in the liquid crystal panel 1, for example, as shown in FIGS. 9 and 18, to detect the brightness of specially provided brightness detection pixels and to make a judgement by determining whether the brightness value has exceeded a specified value. The judgement can also be made by the temperature detection means 20 in the configuration of FIG. 9, or the temperature control means 6 with the temperature detection means incorporated therein in the configuration of FIG. 18, detecting the occurrence in the liquid crystal panel of such a temperature change that causes a brightness difference exceeding the allowable brightness level.

Of course, it is possible to immediately initiate the normalization processing based on the result of the judgement but, since the liquid crystal panel cannot be driven in the normal display mode during the voltage aging processing, as previously described, it is not desirable to perform the processing indiscriminately when the display apparatus is in use. In view of this, provision can be made to perform the normalization processing by selecting the time during which the normalization processing can be performed without causing a problem by also considering the outputs of the optional elements (for example, the timer 23, the utilization judging means 25, etc.).

Further, rather than performing the processing automatically, the normalization processing may be performed manually at a convenient time by alerting the user by using the alarm device 22. The user may make visual inspection for the occurrence of burn-in or may be alerted to the occurrence of burn-in by the alerting means. The alerting can be made by lighting a lamp or the like or by using a special indication on the liquid crystal panel or an alarm sound such as a buzzer. Of course, provisions can be made to issue the alarm and automatically initiate the implementation of the present invention.

In the above explanation, it has been described that the temperature detection means 20 in the configuration of FIG. 9, the temperature control means 6 in the configuration of FIG. 18, or the brightness detection means 21 shown in FIGS. 9 and 18 can be used to implement the method of detecting or judging the occurrence (or the possibility of the occurrence) in the liquid crystal panel of a burn-in phenomenon exceeding the allowable burn-in amount. This will be explained in more detail below.

Figure 21:
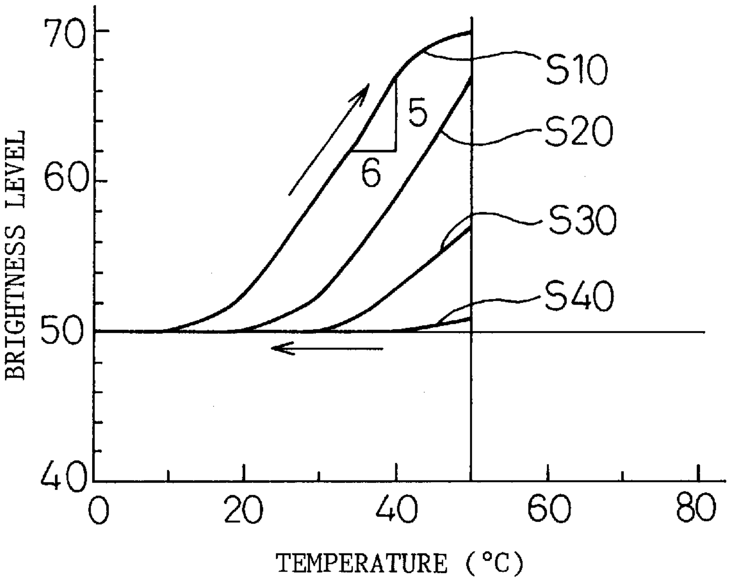
FIG. 21 is a diagram showing a 15th embodiment of the present invention.

FIG. 21 is a diagram for explaining a 15th embodiment of the present invention, showing how the base brightness changes when the temperature at point B in FIG. 5 is varied. In FIG. 21, S20, for example, shows the variation curve of the base brightness when the temperature at point B is set to 20° C. As is apparent from the illustrated data, the same temperature difference does not always cause the same amount of change in the base brightness. For example, in S10, the amount of change of the base brightness from 10° C. to 20° C. clearly differs from the amount of change of the base brightness from 30° C. to 40° C. Further, the amount of change of the base brightness from 30° C. to 40° C. is different between S10 and S30. Therefore, the problem is, from what temperature information the presence of burn-in is to be detected.

The simplest method is to set as the reference the amount of temperature change allowed in a section where the amount of change of the base brightness is the greatest of all the curves. In FIG. 21, it is shown that the amount of change of the base brightness on S10 near 37° C. is 6/5° C. per level. Therefore, when a temperature change greater than 1.2° C. has occurred in the liquid crystal panel in such a direction as to reduce the interlayer spacing within a range of temperatures lower than 50° C., it is uniformly determined that a situation of burn-in has occurred. This method is effective when the temperature of the liquid crystal panel is controlled with good accuracy; however, if the temperature control accuracy is not good enough and temperature rises greater than 1.2° C. occur frequency, the normalization processing is performed or an alarm is issued each time such a temperature change occurs. As previously described in connection with the fifth embodiment, in the case of the liquid crystal panel actually used in the embodiment, burn-in is not discernible as long as the panel is maintained within the temperature range of 40° C. to 60° C.; therefore, if a temperature change such as described above occurs, such a temperature change should be ignored as long as the temperature stays within the above range. If the criterion for detection is modified so that the detection is made only when a temperature change greater than 1.2° C. has occurred outside the allowable temperature range in such a direction as to reduce the interlayer spacing, the situation of excessive detection can be substantially avoided. If a higher detection accuracy is required, the maximum and minimum values of the temperature history should also be considered in determining the detection criterion. It is also possible to use a ROM or the like that stores the data shown in FIG. 21 in the form of a table.

Figure 22:
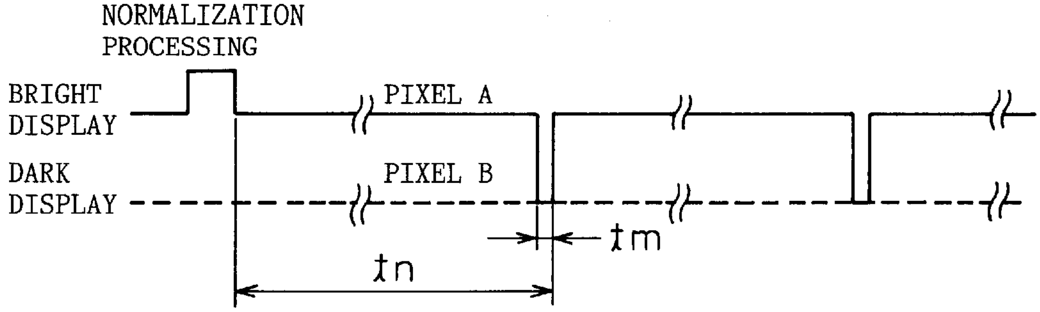
FIGS. 22(*a*), 22(*b*), and 22(*c*) are a diagram showing a 16th embodiment of the present invention.
Figure 22:
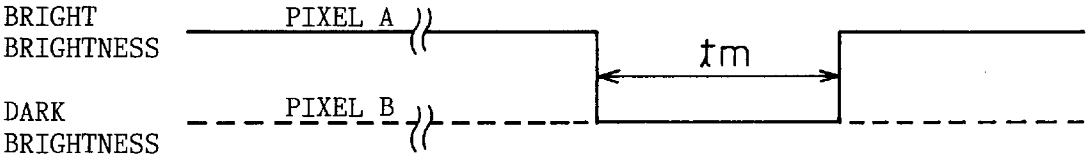
Figure 22:
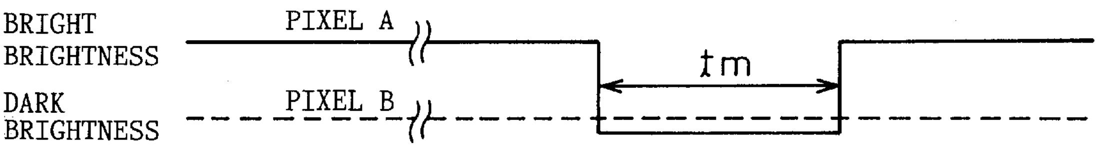

FIG. 22 illustrates a 16th embodiment of the present invention; this embodiment concerns the case in which detection of the burn-in phenomenon is performed using the brightness detection means 21 provided in the liquid crystal panel 1. In this embodiment, two special pixels A and B whose optical transmittance is made detectable by a photodiode or the like are provided in the liquid crystal panel for burn-in detection. The pixels A and B are connected to the driving circuits so that these pixels can be displayed in the bright and dark states and can be treated with the normalization processing, just like the regular pixels.

As shown in FIG. 22(*a*), the pixel A is driven so that it is displayed in the dark state for a short period of time tm at fixed intervals of time tn and in the bright state in other periods except when the normalization processing is performed; on the other hand, the pixel B is driven always in the dark display state.

After the normalization processing is performed, the optical transmittance of the pixel A in the dark state is compared with that of the pixel B in the period tm. If there is no occurrence of burn-in, the base brightness levels of the pixels A and B are both equal to the aging brightness level, so that the optical transmittance in the period tm is equal between the pixels A and B, as shown in FIG. 22(*b*).

However, if burn-in occurs due to a temperature change, the base brightness of the pixel B becomes higher than the aging brightness level, while the base brightness of the pixel A is maintained at the aging brightness level; as a result, a difference occurs in the optical transmittance in the period tm between the pixels A and B, as shown in FIG. 22(*c*). The apparatus can therefore be constructed to issue an alarm or initiate the normalization processing when the difference exceeds an allowable limit.

The above embodiment has dealt with the method that compares the brightness levels of the two special pixels, but in cases where the brightness in the dark display state does not change with temperature when there is no burn-in, or where the temperature of the liquid crystal panel is appropriately controlled, burn-in can be detected by comparing the brightness in the dark display state of only one special pixel with a reference value.

Figure 23:
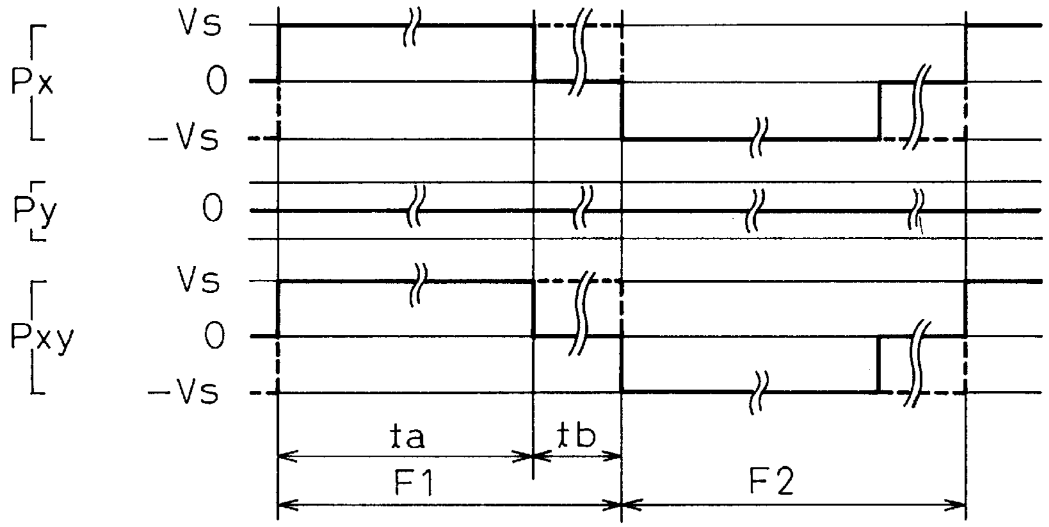
FIGS. 23(*a*) and 23(*b*) are a diagram showing 17th and 18th embodiments of the present invention, illustrating waveforms used in voltage aging processing.
Figure 23:
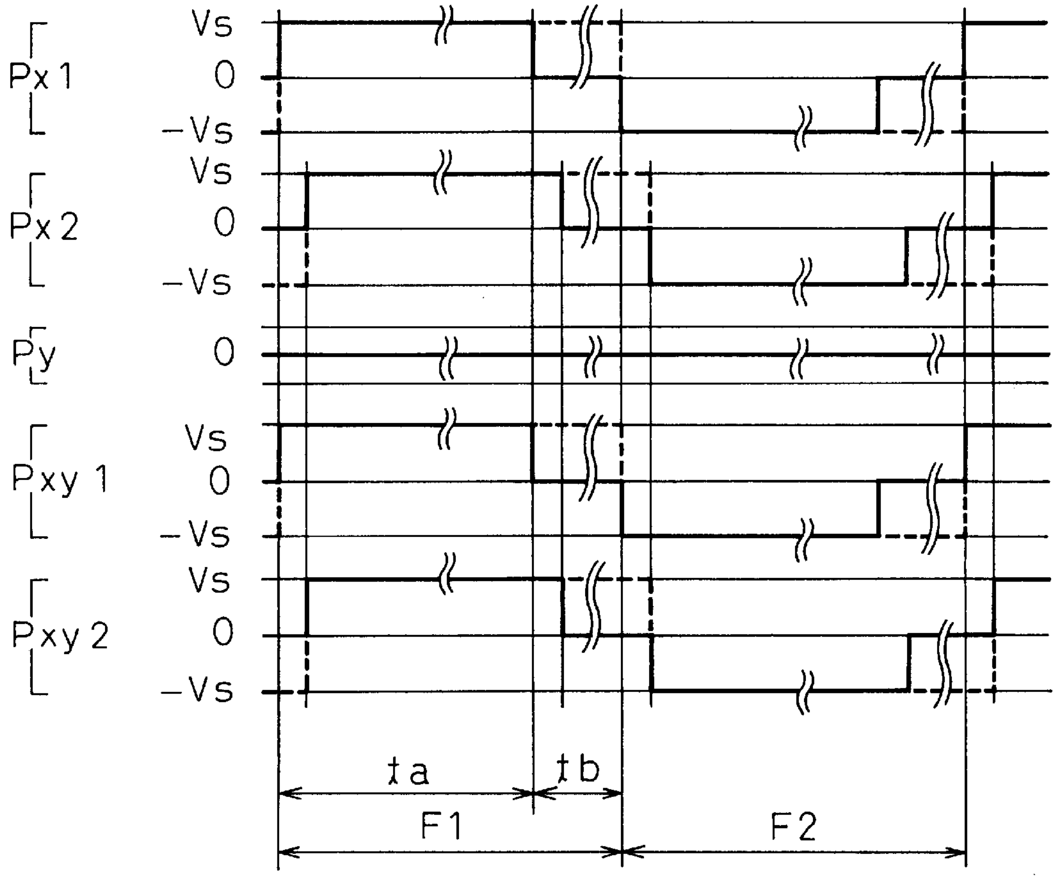
Figure 24:
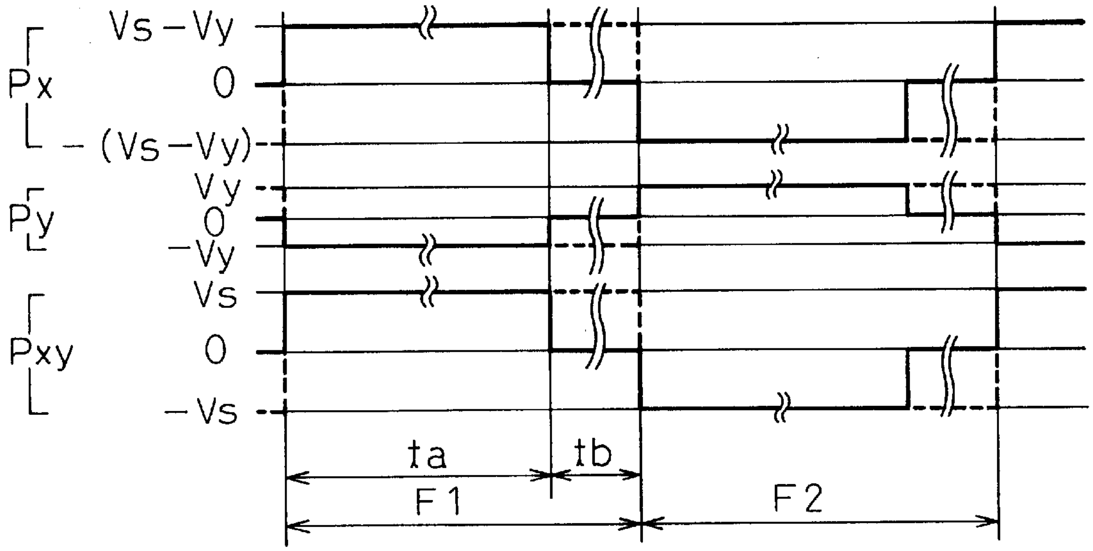
FIG. 24 is a diagram showing a 19th embodiment of the present invention, illustrating waveforms used in voltage aging processing.
Figure 25:
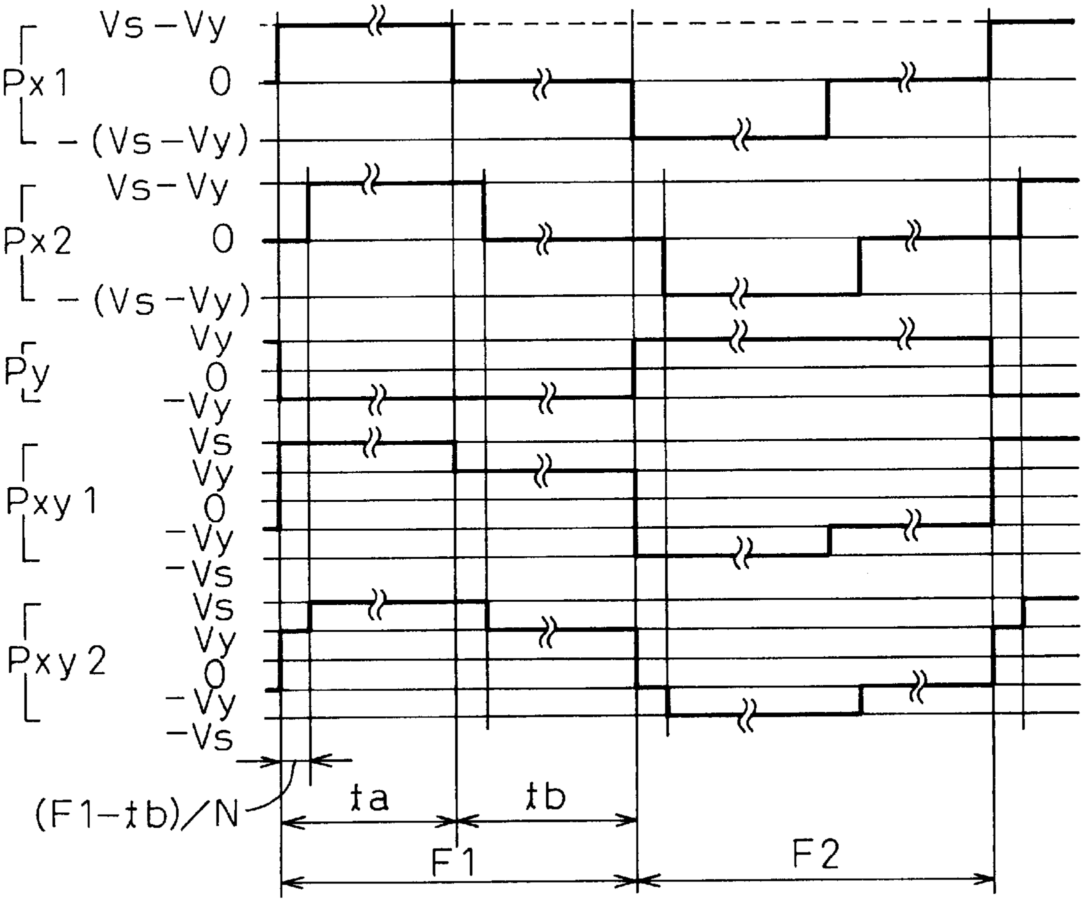
FIG. 25 is a diagram showing a 20th embodiment of the present invention, illustrating waveforms used in voltage aging processing.

FIGS. 23 to 25 illustrate embodiments each concerning the case in which the voltage for the normalization processing is applied to the liquid crystal panel 1 via the row electrode driving circuit 2 and column electrode driving circuit 3 in the embodiment shown in FIG. 8 or 18.

FIG. 23(*a*) is a waveform diagram showing a 17th embodiment of the present invention. In the first frame F1 in FIG. 23(*a*), Px is an output voltage waveform output in common from all the output terminals of the row electrode driving circuit 2, Py is an output voltage waveform output in common from all the output terminals of the column electrode driving circuit 3, and Pxy is a composed voltage applied in common to all the pixels. Px is held at Vs during a period ta and at zero volts during a period tb in the first frame F1, and the polarity of the applied voltage is reversed in the second frame F2. On the other hand, Py is held at zero volts throughout all the periods in the first and second frames.

As a result, Vs is applied to all the pixels during the period ta and zero volts applied during the period tb. When Vs=50 and ta=tb=16.7 ms, this means that the aging waveform shown by the thick solid line in FIG. 8 is applied to the liquid crystal panel.

When Px is held at Vs throughout the entire period of the first frame and at −Vs throughout the entire period of the second frame, as shown by the dashed line in FIG. 23(*a*), and when Vs=50 and F1=F2=16.7 ms, then the voltage processing waveform shown in FIG. 3 is applied to the liquid crystal panel.

The embodiment shown in FIG. 23(*a*) is simple, but since high voltage changes occur in all the pixels at the same time, heavy burdens are placed on the driving circuits and power supply. FIG. 23(*b*) illustrates an 18th embodiment of the present invention in which the time of the voltage change is staggered from one row to the next in order to spread out the high voltage changes. In FIG. 23(*b*), Pxn (n=1, 2, . . . , N) indicates an output voltage waveform of the row electrode for the n-th row. The frame of the n-th row is started with a delay of F1/n with respect to the start time of the frame of the (n−1) th row.

Since the embodiments shown in FIGS. 23(*a*) and 23(*b*) require that the row electrode driving circuit 2 output a voltage |Vs|, if the breakdown voltage of the row electrode driving circuit 2 is smaller than |Vs|, it becomes difficult to carry out the present invention. FIG. 24 illustrates a 19th embodiment of the present invention in which the burden of the row electrode driving circuit 2 is alleviated by configuring the column electrode driving circuit 3 to generate non-zero output voltages in addition to zero volts. In FIG. 24, Px is held at (Vs−Vy) during the period ta and at zero volts during the period tb in the first frame F1, and the polarity of the applied voltage is reversed in the second frame F2. On the other hand, Py is held at −Vy during the period ta and at zero volts during the period tb in the first frame, and the polarity of the applied voltage is reversed in the second frame F2. As a result, Vs is applied to all the pixels during the period ta and zero volts applied during the period tb, and the necessary voltage aging waveform can thus be obtained. In FIG. 24 also, the dashed lines show the voltages for the case of the voltage processing.

FIG. 25 illustrates a 20th embodiment of the present invention, in which the time of the voltage change is staggered to alleviate the burdens of the electrode driving circuits and power supply on the basis of the same concept as that shown in FIG. 23(*b*). In FIG. 25, row voltage Px1 for the first row is held at (Vs−Vy) during the period ta and at zero volts during the period tb in the first frame F1, and the polarity of the applied voltage is reversed in the second frame F2. Row voltage Pxn for the n-th row is identical to the row voltage for the (n−1)th row, except with a delay of (F1−tb)/N. Here, ta≦tb. On the other hand, Py is held at voltage −Vy throughout the entire period of the first frame F1, and the polarity of the applied voltage is reversed in the second frame F2. As a result, |Vs| is applied to all the pixels for the period ta and |Vy| applied for the period tb in each frame. FIG. 25 shows the case of ta+tb=F1, but in the case of ta+tb< F1, the composed voltage applied in other periods than ta and tb in each frame is |Vs−2vy|. In either case, if the liquid crystal molecules are maintained in the bookshelf structure during the period ta, and if those liquid crystal molecules which are supposed to make a transition from the bookshelf structure to the chevron structure in other periods can make the transition, then the aging processing can be performed.

The white brightening burn-in phenomenon will be described from a different viewpoint. In a liquid crystal panel whose base brightness is at the minimum brightness level, when some pixels are displayed in the bright state and others in the dark state and left in such states for a long period of time, the white brightening burn-in phenomenon occurs. The reason is that for the pixels left in the bright display state for a long period of time, voltage aging processing is performed and the base brightness is brought to the aging brightness level, while for the pixels left in the dark display state for a long period of time, the base brightness is maintained at the minimum brightness level since the aging processing is not applied to such pixels. This means that if all the pixels are held in the bright state for a long period of time, voltage aging processing will have been applied to all the pixels. However, since the pixels cannot be driven in the normal display mode during the voltage aging processing, as earlier described, the period of the processing should be made as short as possible.

The present inventor has confirmed that in the drive waveforms shown in FIG. 2, if the values of |V1| and |V3| are made large enough to disable selective driving in bright and dark states and the value of |V2| is made small to drive all the pixels in the bright display state, the voltage aging processing can be performed in a relatively short time. According to this method, the voltage aging processing can be performed by just driving the entire screen in the bright state and changing the set values of the respective voltages, and there is no need to create a waveform having special timing, thus offering an enormous advantage in that the existing driving circuits can be used without any modifications.

In carrying out the present invention, depending on the display apparatus there are cases where the display screen is split into two or more display portions according to the display content, and burn-in, if it occurs in a portion of the screen, does not present a big problem. In such cases, the normalization processing can of course be performed only on the necessary portions of the liquid crystal panel.

Further, it is apparent that no practical problems occur if the normalized level is set at a level exceeding the aging brightness level by dk, as previously described; therefore, "the level approximately equal to the aging brightness level" in the present invention should be interpreted to include the level exceeding the aging brightness level by the allowable brightness difference dk.

To summarize, the normalization processing in the present invention refers to the processing by which the base brightness of all the pixels in the liquid crystal panel that need to be displayed in a uniform state is normalized approximately to the same normalized level, and the normalized level refer to any suitable level between the minimum brightness level and "the level approximately equal to the aging brightness level" (including the minimum brightness level and "the level approximately equal to the aging brightness level").

As described above, specific methods available for the normalization processing are as follows:

(1) Voltage processing alone (including the case where the time is controlled)

(2) Voltage aging processing alone (including the case where the time is controlled)

(3) Voltage processing plus voltage aging processing (4) Temperature aging processing (voltage processing and temperature changing)

The following timings are possible for the time to initiate the normalization processing.

(1) An early stage after the liquid crystal display apparatus has been put in a state ready for display (2) An arbitrary time in the period during which the liquid crystal display apparatus is in a state ready for display (3) An arbitrary time in the period during which the liquid crystal display apparatus is in a state not ready for display (this state is called the preservation state)

The time to initiate the normalization processing can be determined automatically. Alternatively, the initiation time may be determined manually. For manual operation, it is desirable that an alarm indicating the initiation of the normalization processing be issued as necessary.

What is claimed is:

1. An electro-optical apparatus comprising:

an antiferroelectric liquid crystal panel; and processing means for performing a series of normalization processes as many times as necessary to provide uniform brightness, in a no voltage condition, of all pixels required to exhibit a uniform electro-optical performance in a normalized level that is set not lower than a minimum brightness level and not higher than a level approximately equal to an aging brightness level, wherein said minimum brightness level represents a saturation value of the brightness level, in a no voltage condition, obtained by successively applying to said liquid crystal panel for a period of time, a voltage that causes only liquid crystal molecules in an antiferroelectric state to make a transition to a ferroelectric state, and then terminating the applied voltage, and wherein said aging brightness level represents a saturation value of the brightness level, in a no voltage condition, obtained by applying alternately to said liquid crystal panel, a voltage for a period of time that causes liquid crystal molecules in the antiferroelectric state to make a transition to the ferroelectric state and a voltage for a period of time that causes liquid crystal molecules in the ferroelectric state to make a transition to the antiferroelectric state and then terminating the applied voltage.

2. An electro-optical apparatus as claimed in claim 1, including means for applying to said liquid crystal panel, during said normalization processes, a drive voltage of a voltage value different from that of a drive voltage used to produce a normal display.

3. An electro-optical apparatus as claimed in claim 1, including means for applying to said liquid crystal panel, during said normalization processes, a drive voltage of a waveform different from that of a drive voltage used to produce a normal display.

4. An electro-optical apparatus as claimed in claim 1, wherein, during said normalization processes, a voltage waveform is used that applies alternately to said liquid crystal panel, a voltage that causes the liquid crystal in the antiferroelectric state to make a transition to the ferroelectric state and a voltage that causes the liquid crystal in the ferroelectric state to make a transition back to the antiferroelectric state.

5. An electro-optical apparatus as claimed in claim 1, wherein, during said normalization processes, a voltage waveform is used that has a voltage that causes only the liquid crystal in the antiferroelectric state to make a transition to the ferroelectric state.

6. An electro-optical apparatus as claimed in claim 1, wherein said normalization processes comprise first applying repeatedly a voltage waveform that has only a voltage that causes the liquid crystal in the antiferroelectric state to make a transition to the ferroelectric state, and then applying repeatedly a voltage waveform that has both a voltage that causes the liquid crystal in the antiferroelectric state to make a transition to the ferroelectric state and a voltage that causes the liquid crystal in the ferroelectric state to make a transition back to the antiferroelectric state.

7. An electro-optical apparatus as claimed in claim 1, wherein said normalization processes comprise first repeatedly applying a voltage waveform that has only a voltage that causes the liquid crystal in the antiferroelectric state to make a transition to the ferroelectric state, and then applying a temperature change in such a direction as to reduce the interlayer spacing of said liquid crystal molecules.

8. An electro-optical apparatus as claimed in claim 7, wherein the slope of the change of interlayer spacing relative to the change of temperature of said liquid crystal panel is made substantially zero at or near the center of a targeted operating temperature range.

9. An electro-optical apparatus as claimed in claim 1, including means for performing said normalization processes in interlocking fashion with application of a supply voltage to said apparatus.

10. An electro-optical apparatus as claimed in claim 1, including an external operating member, and means for performing said normalization processes based on an operation of said operating member.

11. An electro-optical apparatus as claimed in claim 1, including temperature detection means for detecting the temperature of said liquid crystal panel, and means for performing said normalization processes based on detection information from said temperature detection means.

12. An electro-optical apparatus as claimed in claim 1, including brightness detection means for detecting the brightness of a specific pixel in said liquid crystal panel in a specific display state, and means for performing said normalization processes based on detection information from said brightness detection means.

13. An electro-optical apparatus as claimed in claim 1, including utilization judging means for determining that the display apparatus has remained in an unoperated condition for a specified period of time, and means for performing said normalization processes based on judgement information from said utilization judging means.

14. An electro-optical apparatus as claimed in claim 1, including an external signal input terminal, and means for performing said normalization processes based on an signal supplied from outside said apparatus.

15. An electro-optical apparatus as claimed in claim 1, including a timer, and means for performing said normalization processes based on an signal supplied from said timer.

16. An electro-optical apparatus as claimed in claim 1, including display data judging means for determining that a pattern of display data is a specific pattern, and means for performing said normalization processes based on a signal supplied from said display data judging means.

17. An electro-optical apparatus as claimed in claim 1, including temperature control means for controlling the temperature of said liquid crystal panel.

18. An electro-optical apparatus as claimed in claim 17, wherein the temperature of said liquid crystal panel is controlled at or near a temperature where the slope of the change of interlayer spacing relative to the change of the temperature is zero.

19. An electro-optical apparatus as claimed in claim 17, wherein the temperature of said liquid crystal panel is controlled to within a temperature range where the amount of change of optical transmittance at said no voltage application condition, due to a change in the temperature, is within 2%.

20. An electro-optical apparatus as claimed in claim 17, wherein the temperature of said liquid crystal panel is controlled to within a temperature range where the amount of change of interlayer spacing of smectic layers in ferroelectric liquid crystal, due to a change in the temperature, is 0.2 Angstroms or less.

21. An electro-optical apparatus as claimed in claim 17, including means for initiating said normalization processes when the temperature of said liquid crystal panel approximately reaches a set temperature after power is turned on.

22. An electro-optical apparatus as claimed in claim 1, wherein said normalized level is set approximately equal to said aging brightness level.

23. An electro-optical apparatus as claimed in claim 1, wherein said normalized level is set approximately equal to said minimum brightness level.

* * * * *